(12) United States Patent
Power

(10) Patent No.: US 10,618,674 B2
(45) Date of Patent: *Apr. 14, 2020

(54) LIGHTWEIGHT PORTABLE VEHICLE COVER

(71) Applicant: David & Lisbeth Power Revocable Trust, Gilroy, CA (US)

(72) Inventor: David J. Power, Gilroy, CA (US)

(73) Assignee: DAVID & LISBETH POWER REVOCABLE TRUST, Gilroy, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,935

(22) Filed: Aug. 20, 2018

(65) Prior Publication Data

US 2019/0002126 A1 Jan. 3, 2019

Related U.S. Application Data

(63) Continuation of application No. 15/613,024, filed on Jun. 2, 2017, now Pat. No. 10,053,232.

(Continued)

(51) Int. Cl.
*E04H 15/06* (2006.01)
*B64F 1/00* (2006.01)
(Continued)

(52) U.S. Cl.
CPC ............ *B64F 1/005* (2013.01); *E04H 15/06* (2013.01); *E04H 15/40* (2013.01); *E04H 15/48* (2013.01);
(Continued)

(58) Field of Classification Search
CPC ......... E04H 15/54; E04H 15/02; E04H 15/58; E04H 15/32; E04H 15/06; E04H 15/008;
(Continued)

(56) References Cited

U.S. PATENT DOCUMENTS 2,723,811 A 11/1955 Blomquist
2,778,369 A 1/1957 Tang
(Continued)

OTHER PUBLICATIONS

Lanmodo Technical Specifications. [retrieved Apr. 26, 2019 from the Internet <URL: https://lanmodoaustralia.com/pages/technical-specifications>], 3 pages.
(Continued)

*Primary Examiner* — Winnie Yip
(74) *Attorney, Agent, or Firm* — HIPLegal LLP; Judith Szepesi

(57) ABSTRACT

A portable, lightweight, sturdy and compact aircraft cover that is suspended above the aircraft to provide protection from the damaging effects of the sun and other elements is described. The compact and lightweight aircraft cover is capable, when not deployed, to be carried within the cargo area of the airplane while the aircraft is in operation, and then deployed once the aircraft arrives at its destination. The aircraft cover is very lightweight while at the same time very strong, to allow for the cover to be carried inside the airplane while not adversely impacting the airplane's ability to carry additional fuel or additional passengers and baggage. Furthermore, the cover is designed to be quickly and easily deployed over an aircraft with minimal amount of user effort.

19 Claims, 22 Drawing Sheets

Related U.S. Application Data

(60) Provisional application No. 62/424,374, filed on Nov. 18, 2016.

(51) Int. Cl.
  *E04H 15/40* (2006.01)
  *E04H 15/48* (2006.01)
  *E04H 15/54* (2006.01)
  *E04H 15/56* (2006.01)
  *E04H 15/64* (2006.01)
  *E04H 6/04* (2006.01)
  *E04H 6/44* (2006.01)

(52) U.S. Cl.
  CPC ............. *E04H 15/54* (2013.01); *E04H 15/56* (2013.01); *E04H 15/64* (2013.01); *E04H 6/04* (2013.01); *E04H 6/44* (2013.01)

(58) Field of Classification Search
  CPC ... E04H 6/04; E04H 15/56; B64F 1/00; B64F 1/005; B64F 1/12
  USPC .. 135/88.05–88.07, 88.09, 96, 97, 124, 136, 135/900, 906, 908; 244/1 R, 114 R, 121; 52/63, 222; 150/166
  See application file for complete search history.

(56) References Cited

U.S. PATENT DOCUMENTS

| | | |
|---|---|---|
| 3,133,715 A | 5/1964 | Jean |
| 3,234,695 A | 2/1966 | Lee |
| 3,261,134 A | 7/1966 | Crist |
| 3,270,755 A | 9/1966 | Horvath |
| 3,465,765 A * | 9/1969 | Dietz .................... E04B 1/3441 135/116 |
| 3,550,333 A | 12/1970 | Kliewer |
| 3,708,200 A * | 1/1973 | Richards .................. B60P 3/42 296/173 |
| 3,712,316 A | 1/1973 | Leonard |
| 3,818,652 A | 6/1974 | Pierce |
| 4,008,730 A | 2/1977 | Keklak et al. |
| 4,360,175 A | 11/1982 | Mellblom et al. |
| 4,557,284 A | 12/1985 | Bray |
| 4,589,883 A | 5/1986 | Sutter |
| 4,613,096 A | 9/1986 | Pugh |
| 4,827,958 A * | 5/1989 | Cantwell ............... E04H 15/425 135/119 |
| 4,832,067 A | 5/1989 | Felber |
| 4,886,083 A * | 12/1989 | Gamache ................ E04H 6/005 135/88.06 |
| 4,979,531 A | 12/1990 | Toor et al. |
| 5,179,968 A | 1/1993 | Deichmann |
| 5,390,688 A | 2/1995 | Lipman |
| 6,360,492 B1 | 3/2002 | Ross |
| 6,749,151 B1 | 6/2004 | Ross |
| 7,089,951 B2 | 8/2006 | Bogart |
| 7,131,610 B2 | 11/2006 | Swadling |
| 7,134,627 B2 * | 11/2006 | Warin ..................... B64F 1/005 244/17.11 |
| 7,604,016 B2 | 10/2009 | Songest |
| 9,359,783 B1 | 6/2016 | Josdal |
| 9,480,894 B2 | 11/2016 | Holland |
| 9,593,507 B1 | 3/2017 | Aicher |
| 2004/0163694 A1 | 8/2004 | Bogart |
| 2005/0061917 A1 | 3/2005 | Ross |
| 2009/0025768 A1 | 1/2009 | Songest |
| 2010/0200035 A1 * | 8/2010 | Jordache .................. E04H 6/04 135/96 |

OTHER PUBLICATIONS

Lanmodo Website. [retrieved Apr. 26, 2019, from the Internet <URL: https://www.lanmodo.com/lanmodo-pro-4-season-automatic-car-tent.html>], 5 pages.
Lanmodo, All-in-one automatic car tent—Lanmodo. Youtube. Apr. 7, 2017 [retrieved Apr. 26, 2019, from the Internet <URL: https://www.youtube.com/watch?v=dFaBdsLHZpQ>, shown in screenshots (14 pages).
PCT Search Report for PCT/US2017/061874.
PCT Written Opinion for PCT/US2017/061874.

* cited by examiner

LIGHTWEIGHT PORTABLE VEHICLE COVER

RELATED APPLICATION

The present application claims priority to U.S. patent application Ser. No. 15/613,024, filed on Jun. 2, 2017, issuing as U.S. patent Ser. No. 10/053,232 on Aug. 21, 2018, which claims priority to U.S. Provisional Application No. 62/424,374, filed on Nov. 18, 2016. The entirety of both applications is incorporated herein by reference.

FIELD

The present invention relates to a lightweight portable vehicle cover. More particularly, the present invention relates to a portable canopy shelter that is tightly suspended over the upper surface of a vehicle, is light weight, and can be disassembled and carried in the vehicle and deployed at any location.

BACKGROUND

A need has long existed for a lightweight, portable, sturdy, and easy to assemble shelter to protect airplanes and other winged aircraft or fragile vehicles from the elements while parked on a flight line or otherwise not in use while on the ground.

Airplanes are very expensive and complex vehicles that contain equally expensive and very sophisticated avionics and navigation systems. Other vehicles and equipment of similar value, such as expensive cars, are sheltered when not in use to protect them from the damaging effects of the sun and the elements. However, airplanes parked on a flight line, or otherwise parked on the ground while not in use, are exposed to the deteriorating effects of the sun, and the elements, leading to excessive deterioration of exterior surfaces as well as the seats, instrumentation, avionics and navigation equipment located in the interior cabin.

Unprotected from the elements, an airplane's exterior surfaces can be physically damaged in extreme weather conditions. Both the external surfaces of the aircraft and its internal support members can become subject to excessive corrosion. Undetected, the resulting corrosion could, in time, lead to catastrophic weakening or warping of the airfoil surfaces, making the airplane dangerous to operate, and possibly no longer airworthy. While these corrosive effects result from exposure to the elements over time, there are some weather conditions that can have an immediate damaging effect to an unprotected airplane, such as hail. A severe hail storm may last only a few minutes, but the hail's impact on an airplane's wings and control surfaces can be the same as that of a ball peen hammer being struck against the surfaces, creating multiple divots. These hail divots can make an airplane that was a few minutes earlier completely usable (and no longer capable of being licensed as airworthy), with required repairs being so extensive that the aircraft may have to be salvaged.

Absent extreme weather conditions, the cockpit seats and the interior headliner, instrumentation and sophisticated electrical navigation and radio equipment are subjected to extreme heat cause by the convective and conductive greenhouse heating effect of the sun. The sun, shining through the aircraft's Plexiglas windshield and windows, can create temperatures in excess of 140 degrees Fahrenheit within an hour of exposure. Prolonged exposure to such heat can render interior instrumentation and radios inoperative, resulting in the need for expensive repairs.

Some airports do not have any fixed hangars to protect the airplanes on the flight line from the elements, while other airports will have a limited number of hangars for airplane owners to lease or purchase. However, the number of airplanes at such airports will far outnumber the available hangers. Waiting lists for hangers to become available can be very long, taking many years for a hangar to become available. As a result, airplane owners and operators have relied upon the use of airplane covers that consist of simple plastic or canvas to protect their airplanes from the deteriorating effects of the sun and the elements. These covers are generally form fitting and are stretched over the wings and body of the airplane to aid in protecting the airplane's surfaces. However, a disadvantage of these conventional covers is that they come into contact with exterior surfaces of the aircraft, and the objects that are affixed to the exterior surface, such as dirt or other contaminants. This direct contact can lead to damage to the exterior surface, such as when dust or dirt is entrapped in the cover and wind causes the cover to flutter and rub on the aircraft surface. This can cause scratching and other damage to polished and/or painted surfaces, thereby exposing the surfaces to corrosion, as well as causing damage to external objects attached to the aircraft such as radio and navigation antennae, which can lead to unsafe operating conditions. In the event of a hail storm the direct contact of the cover with the exterior surface may also not protect the surface from the hail's impact damage.

To overcome the disadvantages of conventional airplane covers, some prior art has suggested the use of portable hangars that can be assembled and disassembled to allow for protection of the airplane while parked. An example of such a structure is taught by Bogart in U.S. Pat. No. 7,089,951, issued Aug. 15, 2006. In Bogart's design a rigid structural skeletal frame is anchored to the ground, and is used with a cantilever structure. The frame and cantilever structure provide connections and support for cables and material to cover and protect the airplane. However due to the anchoring requirements, it is not possible to carry this shelter within the airplane itself when it is parked away from its home airport. Similar type designs were also suggested by Bray in U.S. Pat. No. 4,557,284 and by Ross in U.S. Pat. No. 6,360,492. In Ross, while there were no permanent anchors for the base structure of the shelter, the structure itself was very large and when broken down for transport would require a truck to move it to a new location, thereby making it impossible to be placed inside the aircraft being sheltered and used at locations other than the aircrafts home airport.

SUMMARY

It is therefore one of the objectives of this invention to provide a portable, lightweight, sturdy and compact aircraft cover that is suspended above the aircraft to provide protection from the damaging effects of the sun and other elements, in the same way as a commercial aircraft hangar.

It is also an object of this invention to provide a compact and lightweight aircraft cover that is capable, when not deployed, to be carried within the cargo area of the airplane while the aircraft is in operation, and then deployed once the aircraft arrives at its destination.

A further object of this invention is to provide an aircraft cover that is very lightweight while at the same time very strong, to allow for the cover to be carried inside the airplane while not adversely impacting the airplane's ability to carry additional fuel or additional passengers and baggage.

Still another object of this invention is to provide a strong, lightweight, portable and compact aircraft cover that can be quickly and easily deployed over an aircraft with minimal amounts of user effort.

BRIEF DESCRIPTION OF THE FIGURES

The present invention is illustrated by way of example, and not by way of limitation, in the figures of the accompanying drawings and in which like reference numerals refer to similar elements and in which.

Similar reference characters refer to similar parts throughout the several views of the drawings.

DETAILED DESCRIPTION

Figure 1A:
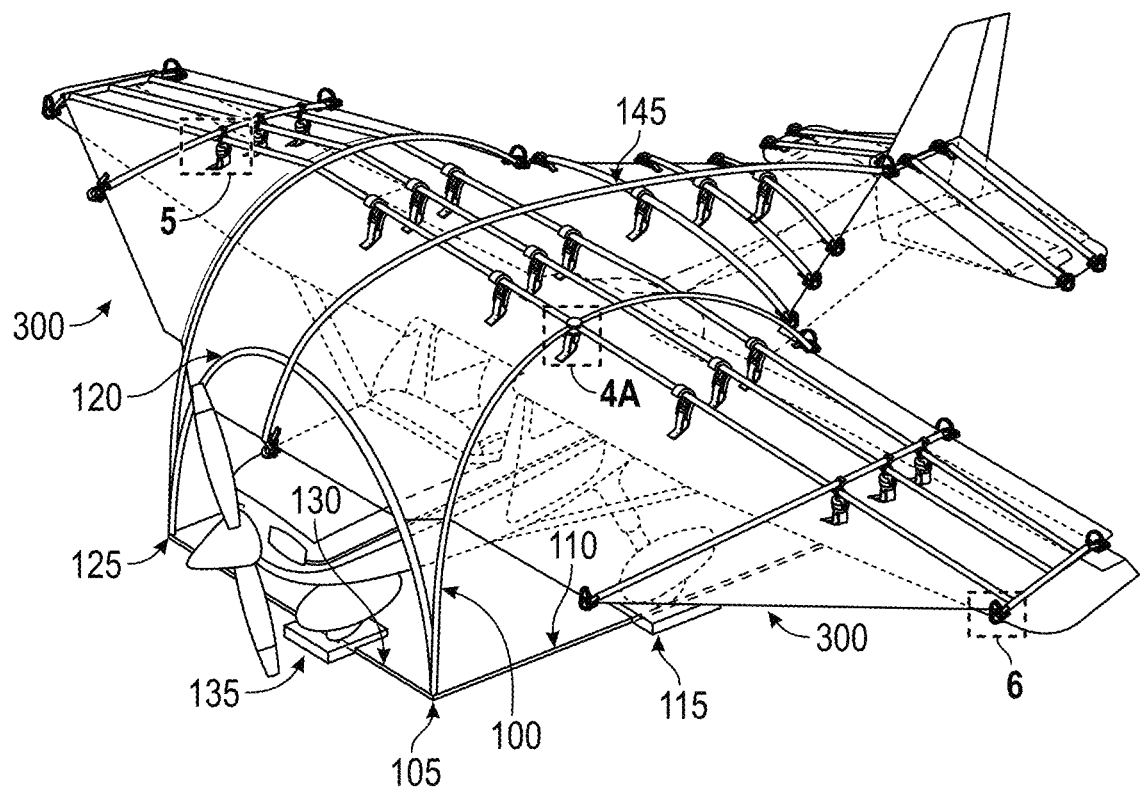
FIG. 1A is a perspective view of an exemplary airplane, showing one embodiment of the portable aircraft cover used on a high wing single engine aircraft.

A portable aircraft cover for an airplane is disclosed. The portable aircraft cover forms an extremely light weight structure, that can be easily assembled and disassembled, and can be carried inside the aircraft to be covered without negatively impacting the load capabilities of the airplane. Such a structure is designed to be easy to assemble by the pilot without assistance, to substantially cover an airplane to protect it from the elements. In one embodiment, the cover permits convenient access to the airplane, even after it is deployed.

A portable, lightweight aircraft cover for use with fixed wing airplanes is described. In one embodiment, a frame assembly comprising a series of anchor poles and support poles is designed to support a lightweight cover sheet that is secured to each of the wing tips and each tip end of the horizontal stabilizer via a cuff or sleeve designed into the cover sheet. The cover sheet itself is suspended above the aircraft surfaces, via fasteners attached to the cover sheet and coupled to the support poles, to minimize contact with the aircraft surface areas and create a buffer between the aircraft and potentially damage causing particles such as hail, grit, etc. and to provide protection from damage caused by the sun. Such fasteners may be clips, hook and loop fasteners, and/or other attachment mechanisms.

In one embodiment, the support poles are inter-connected via the use of hubs and fasteners to provide a rigid frame to support the cover sheet. The support poles are attached to a set of base plates held in place by the aircraft, either through the use of the aircraft's weight or affixed to the aircrafts structure. Extending from the base plates are a set of attachment poles, or "base plate poles" to which the support poles attach. In one embodiment, the support poles are secured to the base plates by having the base plate poles extend from the base plate beyond the aircraft wing and contain anchor points for the tips of the anchor poles to be inserted and secured. Support poles secured to the base plate via the base plate poles are referred to as "anchor poles".

It should be appreciated by those skilled in the art that the conception and the specific embodiments disclosed may be readily utilized as a basis for a protective lightweight and portable cover sheet for aircraft of different designs and dimensions using the principles described, to carry out the same purpose. Those skilled in the art will also recognize that while the invention is described in use with an aircraft, it could also be adapted for use with other vehicles, such as cars and boats. It should also be realized by those skilled in the art that such equivalent constructions do not depart from the spirit and scope of the invention as set forth in the appended claims.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

The lightweight, portable, compact airplane cover, is made of very strong material and equally strong components. In one embodiment, the cover is made of carbon fiber materials. The assembly in one embodiment includes base plates, that act as an anchor for lightweight collapsible poles, and that can be placed under the aircraft wheels or be mounted to the aircraft. These anchoring elements are referred to as "base pads" or "base plates" though they may not be shaped like a conventional pad or plate.

In one embodiment, the various support poles used are color coded or otherwise marked to indicate where they are to be deployed. In one embodiment, each of the poles has an internal elastic shock cord that allows the pole's segments to be easily and compactly grouped together, and when in use extended and fitted together to create a single support pole.

The internal shock cord allows the support poles to be quickly broken down while maintaining the connectivity to the other poles sections, to avoid pole sections from being mismatched. This ensures fast assembly and assists in maintaining the correct length for each support pole. The poles are used to provide rigidity to the lightweight sheet that covers the airplane. Such poles are referred to as "structure poles" or "support poles". In one embodiment, the poles are attached to the cover sheet, alternatively referred to as "cover material" or "sheet material" by clips, sleeves incorporated into the sheet material, or other types of attachments.

The base plate, which can be held in place by the main wheels of the aircraft, forms the foundation and anchor point for the cover, in one embodiment. In alternative embodiments, as shown in FIG. 11 through FIG. 15, the base plates are affixed to the aircraft, rather than being placed on the ground. This may be particularly useful for airplanes such as amphibious or "float" aircraft which do not have wheels.

Lightweight base plate poles, or "base poles" are attached to the base plate. The base poles are in one embodiment larger than the support poles, but similarly incorporate an internal elastic shock cord for quick assembly and breakdown. When the base poles are extended, they are attached to the base plates and extend outward beyond the aircraft wing. In one embodiment, the base poles extend outward from the nose of the aircraft and parallel along the wing from the nose wheel base plate; the base poles from the main wheel base plate extend orthogonally from the wing. In one embodiment, the base poles each have receptors are their tips into which the ends of the anchor support poles or "anchor poles" attach.

In one embodiment, the main wheel or wing anchor poles form an arcuate shape over the top of the aircraft's wing from the ends of the base poles extending from main wheel base plates. In one embodiment, an arcuate shape over the aircraft's cowling is formed when nose anchor poles are attached to the base poles for a nose wheel base plate.

In one embodiment, the edge of the sheet material covering the nose cowling and the wings and fuselage also incorporates receptacles to receive the ends of support poles, that form a rigid frame for supporting the sheet material. In one embodiment, the support poles include longitudinal and lateral support poles.

In one embodiment, the lightweight sheet material, has a pocket or cuff built into two ends for the wingtips, and is fitted over the each of the wingtips. In one embodiment, incorporated into the sheet material at the proximate end of the wingtip cuff is a buffer that biases against the upper wingtip surface to maintain a space between the covering sheet and the wingtip surface. This buffer is a soft rubber material, in one embodiment. In one embodiment, the buffer is built into the interior of the wingtip cuff. Also incorporated within the sheet material at the end of the wingtip cuff, in one embodiment, is a series of receptacles to fit the tip of the "wing" or "lateral" support poles.

The sheet material, once attached to the aircraft's wingtips, extends along the aircraft fuselage to the aircraft's vertical stabilizer. In one embodiment, a lightweight clamp is secured to the vertical stabilizer. Extending outward from the vertical stabilizer, the sheet material, in one embodiment, incorporates one or more of pockets or cuffs, a buffer, and receptacles for structure poles similar to the wingtip cuff. These cuffs are fitted over the ends of the aircraft's horizontal stabilizer. In one embodiment, a vertical clamp is designed to incorporate a series of receptors at the front of the vertical stabilized and along each side to receive the tips of support poles and provide support for the sheet material.

Once the wingtip and horizontal stabilizer cuffs are fitted, the sheet material is attached to the two arcuate anchor poles over the wing and the arcuate nose anchor pole over the nose of the aircraft. In one embodiment, the sheet material is attached to the anchor poles using clips or another attachment mechanism attached to the sheet. Support poles are then fitted within the wingtip cuffs and/or horizontal stabilizer cuffs receptacles to run the length of the wing and are attached to the two arcuate wing anchor poles over the wing.

In one embodiment, a longitudinal support pole is fitted to run the length of the fuselage, attaching to the nose anchor pole attached to the nose wheel base plate, and having one end point connected to the receptacle in the cowling portion of the cover sheet and the other end point connected to the receptacle in the cuff attached to the vertical stabilizer. The end of the longitudinal support pole could extend beyond the connection point at the nose anchor pole and be inserted into a connector on the cover sheet material. In one embodiment, the connector may be a ball/cap connector thereby extending the sheet to cover more of the cowling. The longitudinal support pole(s) along the fuselage are secured to the arcuate nose anchor pole and the intersecting wing structure poles. In one embodiment, one side of the support pole ends are fitted into receptacles in the cuff over the horizontal stabilized ends, with the other ends fitted into the receptacles incorporated along the vertical stabilizer clamp connected to the vertical stabilizer. The sheet material in one embodiment has clips incorporated within the material, and is clipped to the structural poles. In one embodiment, supplemental support poles in addition to the main latitudinal and longitudinal support poles work together to create a rigid frame to which the cover sheet is coupled. The sheet material provides rigidity to the frame, and the frame provides a base for the sheet material that minimizes contact between the sheet material and the aircraft's surface. The sheet material and the gap between the sheet material and the aircraft provides for protection against the elements, including hail, gravel, and similar materials which may otherwise damage the aircraft's surface as well as the sun.

Figure 1B:
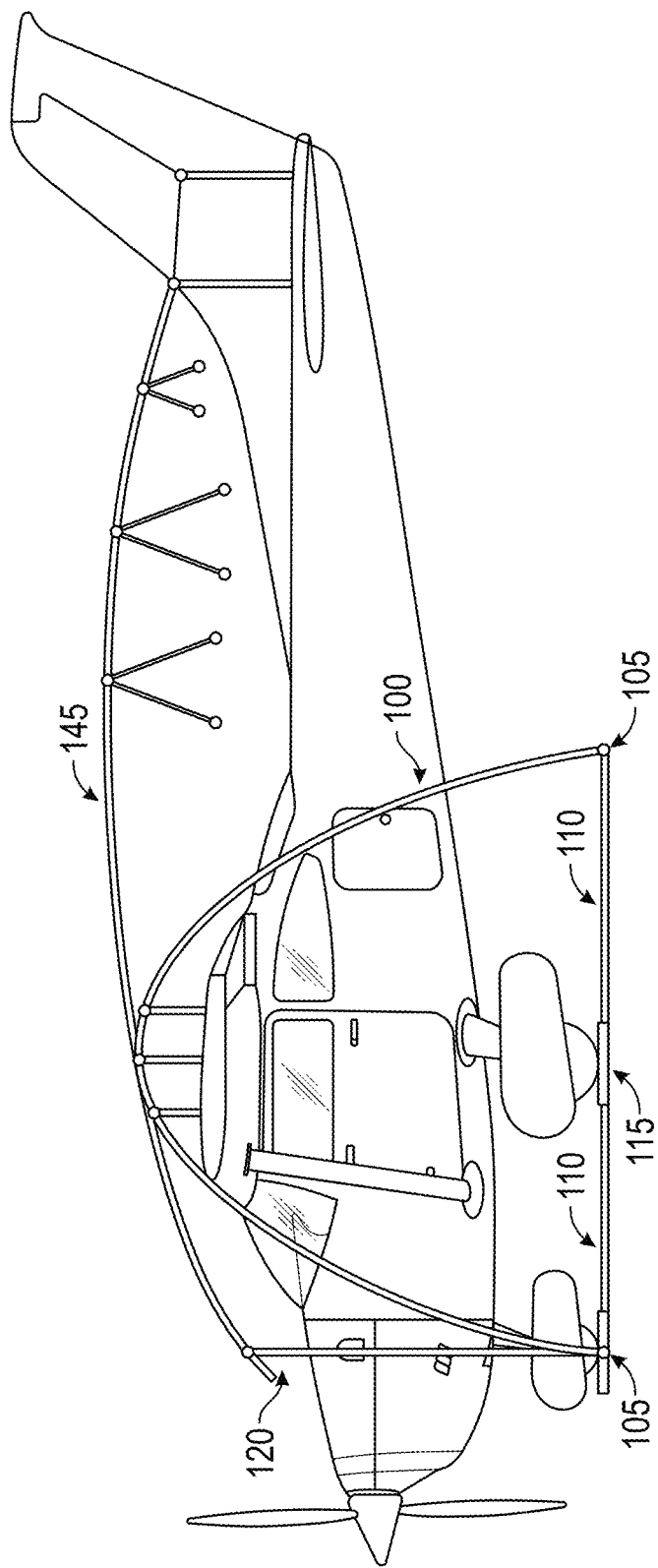
FIG. 1B is a side view of one embodiment of an example airplane, a Cessna 182, showing a view of the support poles used in one embodiment.

FIG. 1A is a perspective view of an exemplary airplane, showing one embodiment of the portable aircraft cover used on a high wing single engine aircraft. FIG. 1B is a side view of the plane of FIG. 1A, showing one embodiment of the support poles and anchor poles of the cover deployed. The exemplary airplane in this case is a Cessna 182, but one of skill in the art would understand that the cover described may be used on any aircraft. Left wing anchor pole 100 is shown in its deployed position with each pole end 105 being anchored to the end of a base plate pole 110 extending outward in opposite directions from the main wheel base plate 115 located under the left main wheel, as shown in FIG. 1A.

Figure 6:
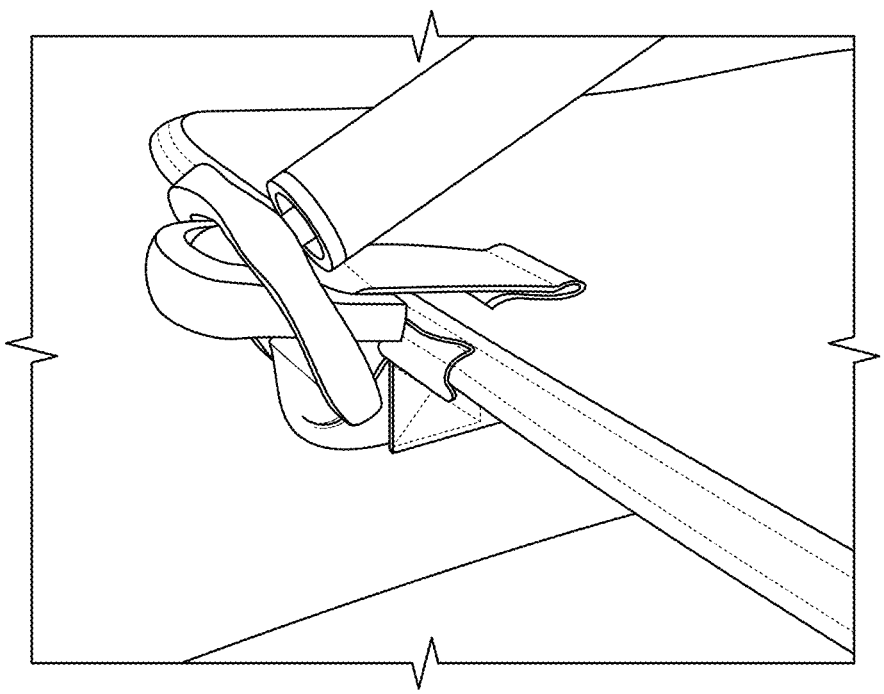
FIG. 6 depicts one embodiment of a Ball Cap type connector which may be used for securing the support poles to the peripheral edges of the sheet material that will cover the aircraft.

The anchor used to secure the anchor pole 105 end to the base plate can be a "type B" Ball Cap connector port, such as the one shown in FIG. 6, or other securing apparatus, such as locking pole tips used in conjunction with a grommet. The base pole for the right wing is similarly deployed using a right main wheel anchor base plate 115, and base plate poles 110.

Figure 1C:
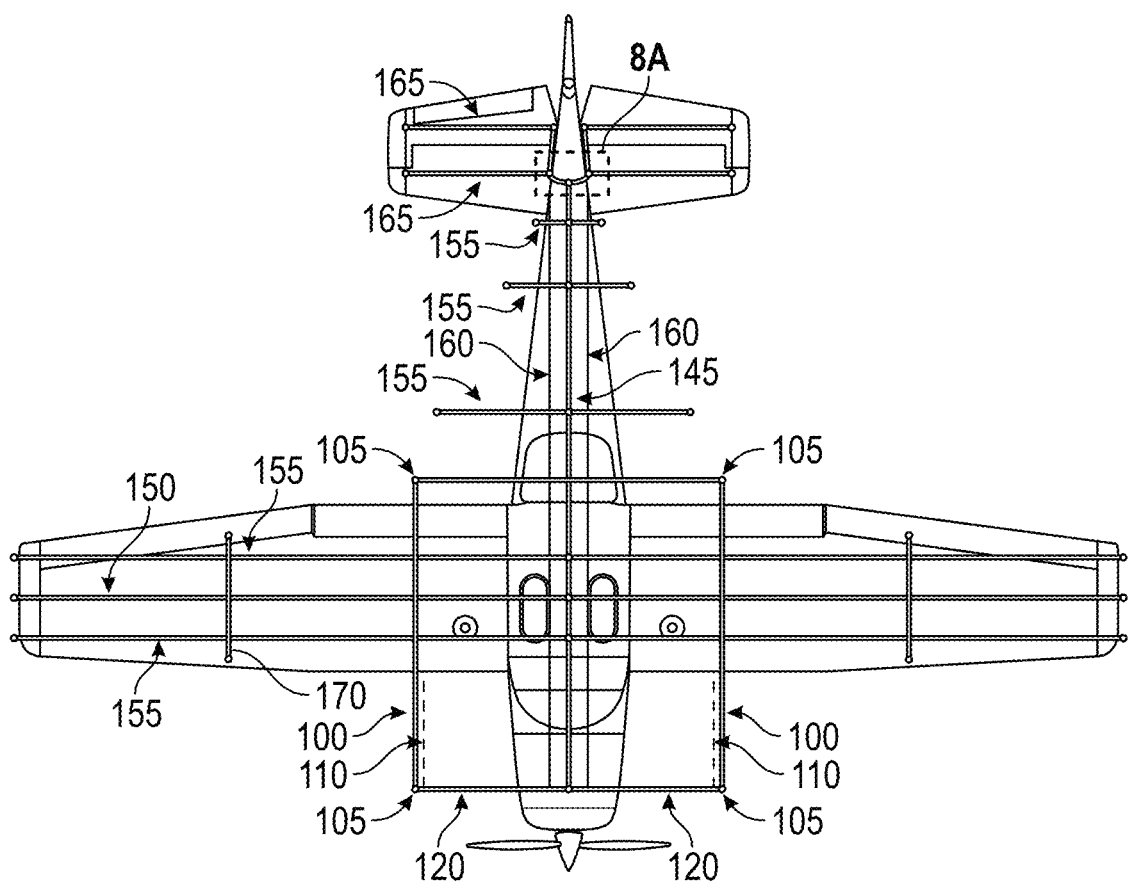
FIG. 1C is a plan view of the Cessna 182 illustrating the arrangement of the support poles used in accordance with one embodiment.
Figure 1D:
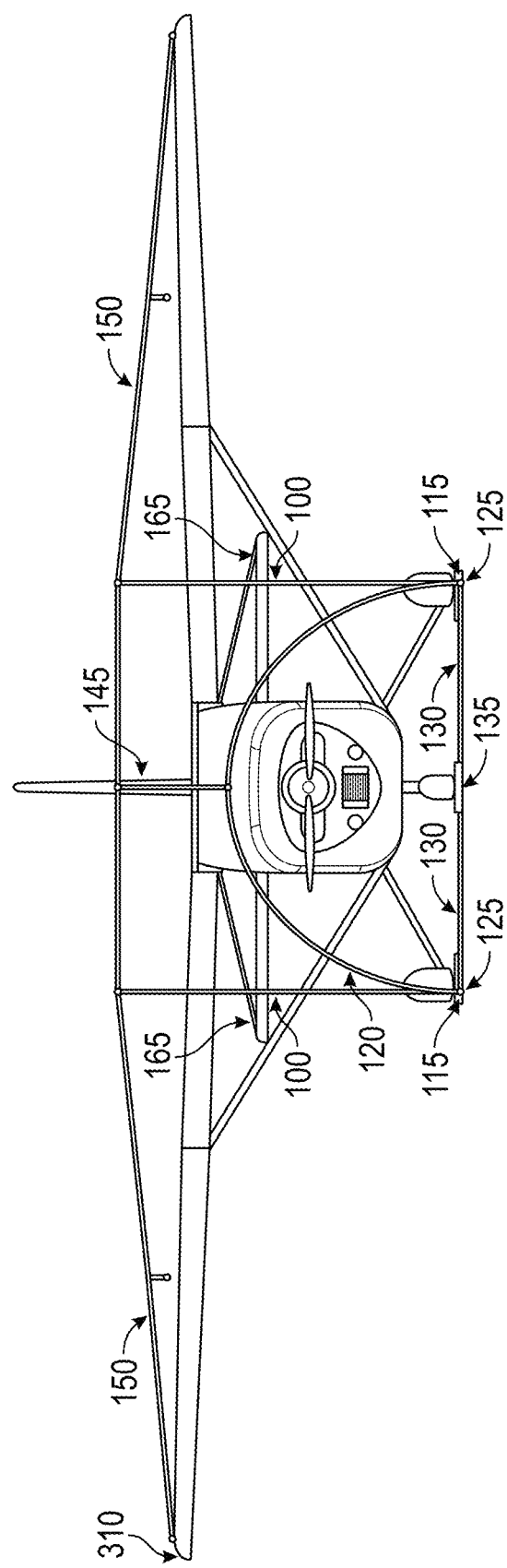
FIG. 1D is a front view of the Cessna 182 illustrating the arrangement of the support poles used in accordance with one embodiment.

FIG. 1D illustrates the plane of FIG. 1A from a front view. It shows one embodiment of the nose anchor pole 120 which has its pole ends 125 connect to a nose wheel base plate pole 130 that extends outward horizontally from a nose wheel base plate 135 positioned under the nose wheel.

FIG. 1C shows one embodiment of the layout of the poles, which shows relationship of some of the poles.

Figure 7A:
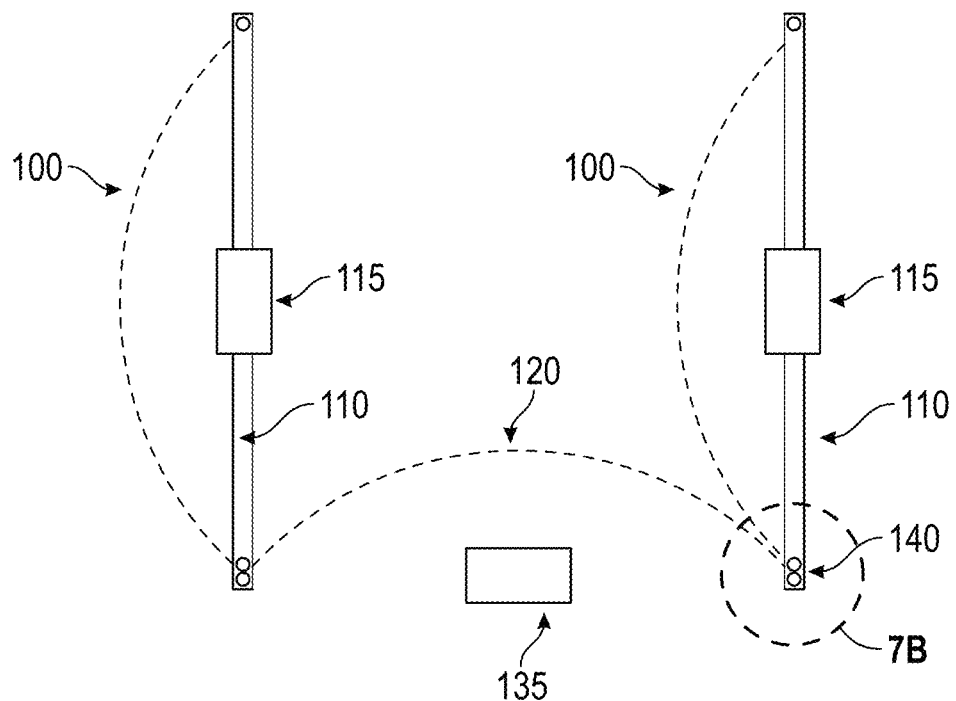
FIG. 7A depicts a plan view of one embodiment of the arrangement of the main wheel base plates and the nose wheel base plate, on the ground, that is used to secure the anchor poles.

In one embodiment, as shown in FIG. 7A, main wheel base plate pole (shown in FIG. 1B as element 110) may have two connector ports 140 at the end of each outwardly extending base pole end, that would securely connect both the left and right wing forward anchor pole, as well as the nose anchor pole within the same connector end. This would avoid the need for nose base plate pole and allowing the nose anchor pole 120 to be secured to base plate pole 110 via the dual connector 140. The dual connector 140 could alternatively be incorporated into a nose wheel base plate pole, as shown in FIG. 1D as element 130, thereby eliminating the need for the forward main wheel base plate pole 110.

Figure 11:
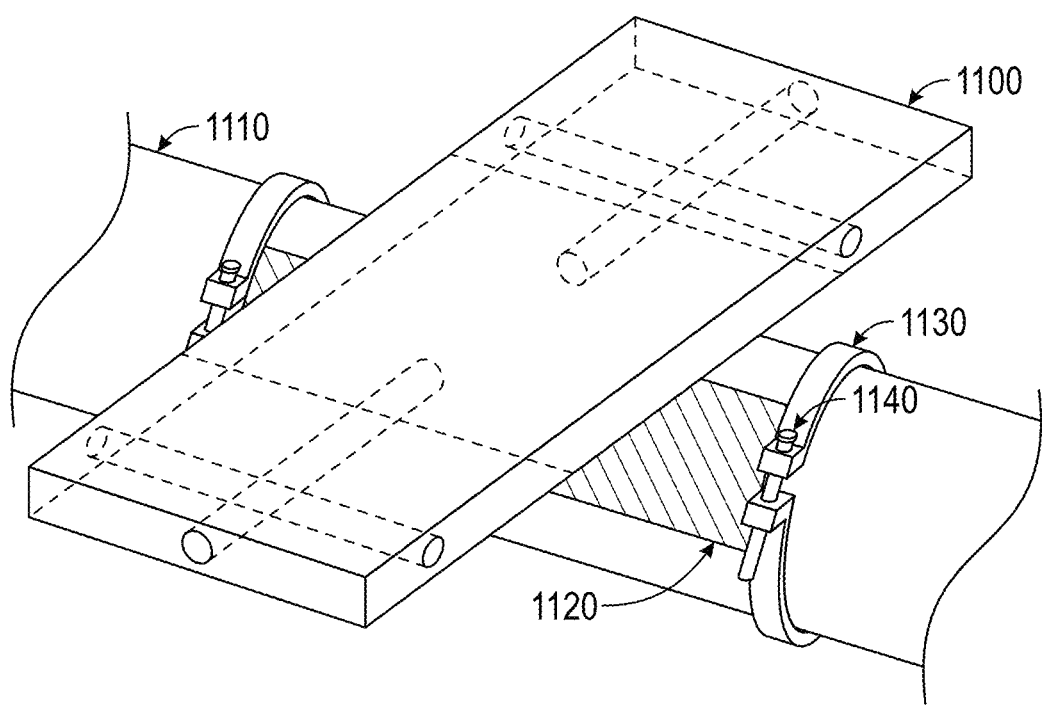
FIG. 11 is an oblique lower view of an aircraft wing strut showing one embodiment of a clamp affixed to the wing strut to act as a support for a base plate.

In one embodiment, the base plate poles are constructed of the same material as the anchor and support poles, but are larger to provide the necessary rigidity and strength, and are secured to the main wheel base plates 115, and nose wheel base plate 135; or as shown in FIG. 11, secured to the base plates affixed to the aircraft itself.

Figure 7B:
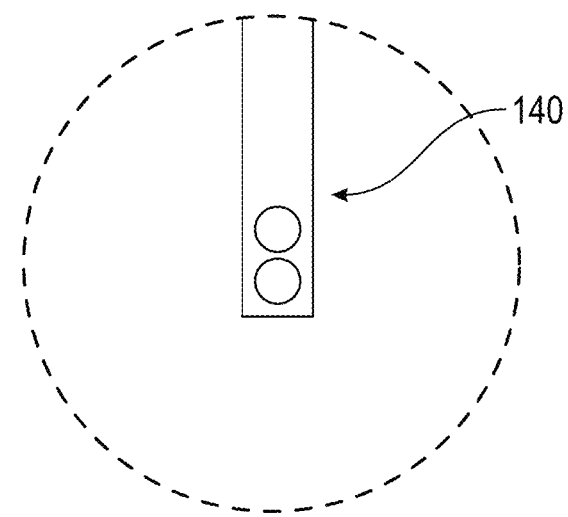
FIG. 7B depicts a close-up plan view one embodiment of the end of the base plate pole, and the dual port for the anchor poles to be inserted and secured to the base plate poles.
Figure 7C:
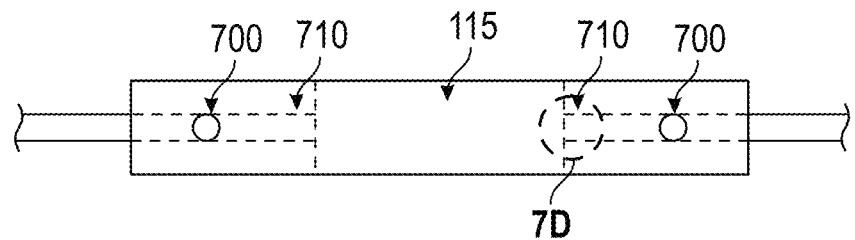
FIG. 7C depicts a side view of one embodiment of the base plate of FIG. 7B and its internal cavity for inserting and securing the base plate poles.
Figure 7D:
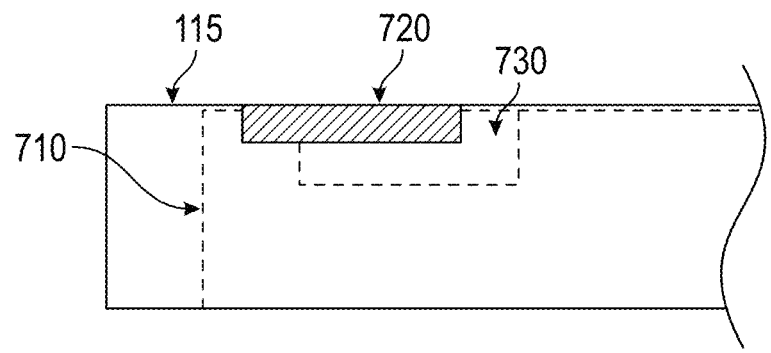
FIG. 7D depicts a close up of one embodiment of the base plate cavity and an example of a locking mechanism to secure the base plate pole into the cavity.

In one embodiment, as depicted in FIGS. 7C and 7D, the base plate poles, once inserted into the base plate cavity 710, can be secured to the base plate via a port 700. In this configuration, a locking pin can be inserted into port 700 to secure the base plate pole in place. Alternatively, an internal form of locking means can be incorporated into the cavity 710 such as tab 720, as shown in FIG. 7D. In this configuration, the base plate pole incorporates a groove-slot 730, that aligns with locking tab 720 once the base plate pole is fully inserted into base plate cavity 710. Once fully inserted, the base plate pole is twisted to allow for a firm fit within the base plate cavity 710. In a preferred embodiment both a locking pin and a locking tab mechanism is used to ensure the base plate pole is securely attached to the base plate.

Referring again to FIG. 1B, one embodiment of the structural components without the cover sheet material are shown, including a main longitudinal support pole 145 running along the longitudinal axis of the aircraft, from the nose anchor pole 120, to the aircraft's vertical stabilizer in the rear. The longitudinal support pole and other support poles are secured to the covering sheet material, in one embodiment.

Figure 4A:
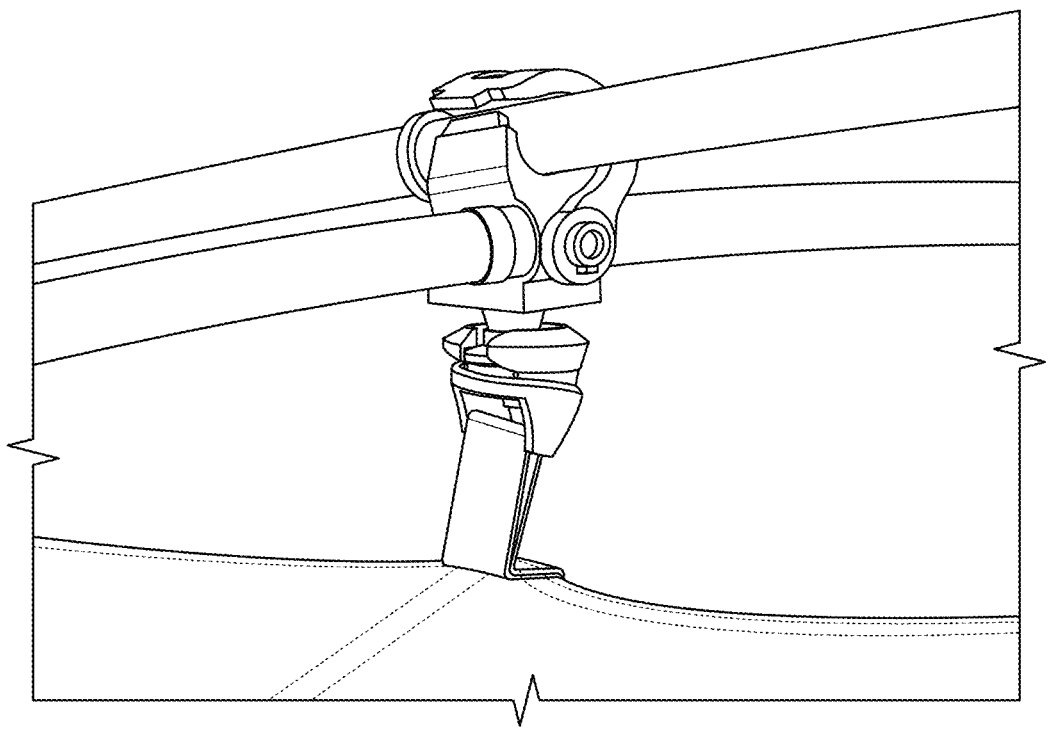
FIG. 4a depicts one embodiment of a locking connector hub for the interlocking of the anchor poles and support poles.
Figure 4B:
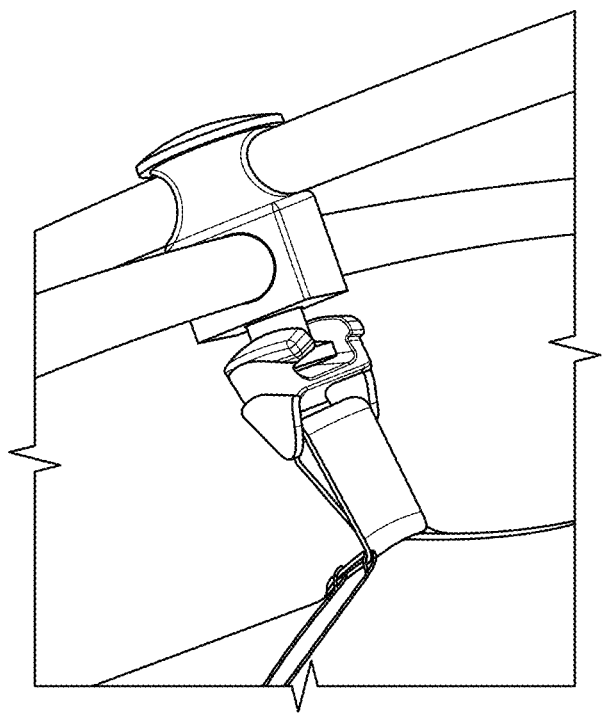
FIG. 4b depicts another embodiment of a locking connector hub for the interlocking of the anchor poles and support poles.

Referring now to FIG. 1C, one embodiment of the arrangement of support and anchor poles is shown without the covering sheet material. In one embodiment, the main latitude or wing support pole 150 is depicted running along the length of the wing and the latitudinal axis of the aircraft. The main latitude support pole 150 is secured to the left wing and right wing anchor poles 100 and the main longitudinal support pole 145. In one embodiment, a hub connector apparatus, such as those shown in FIGS. 4A and 4B, is used to secure support poles 145 and 150 to each other. The connections between the anchor poles and the support poles is also depicted by point "4A" in FIG. 1A, referencing the hub type connectors in FIGS. 4A and 4B.

Figure 8A:
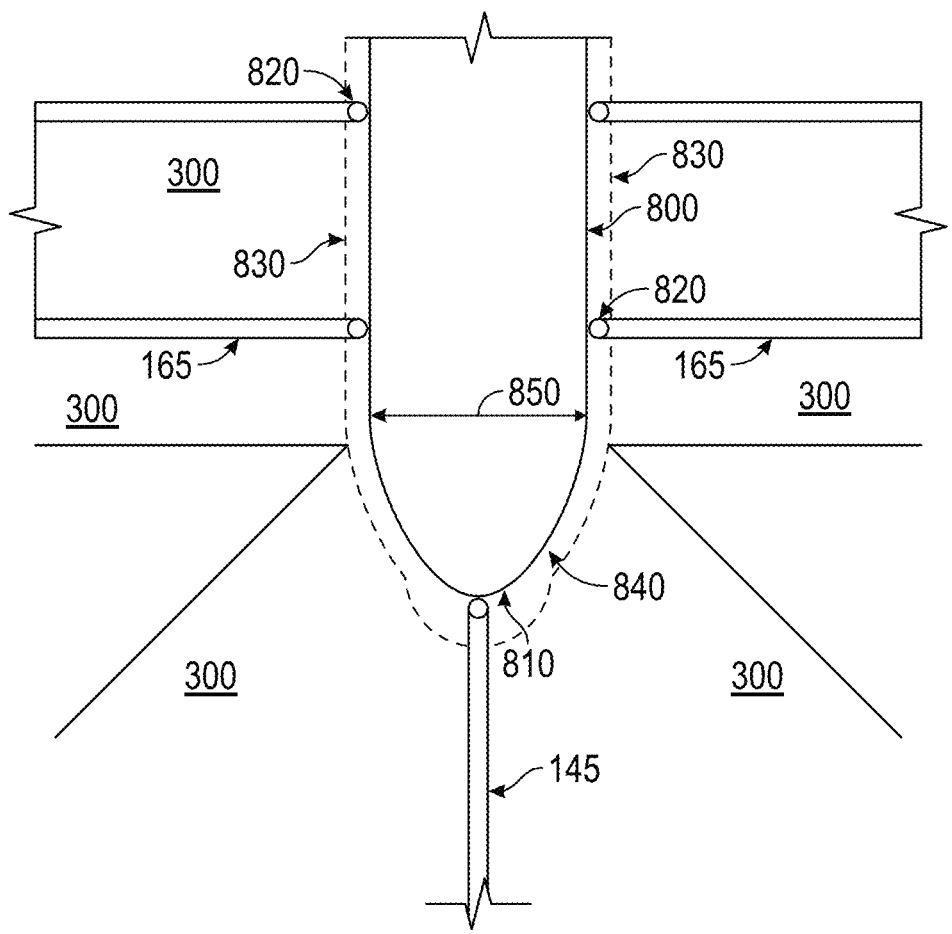
FIG. 8A is a plan view of one embodiment of the vertical stabilizer of the aircraft depicting an anchor cuff attached to the aircraft's vertical stabilizer and used to support the support poles and sheet material when fitted to the tail section of the aircraft.

Additional lateral support poles 155 and additional longitudinal support poles 160 can be incorporated on either side of the main lateral support pole 150 and main longitudinal support pole 145 to provide additional strength and rigidity for extreme weather conditions. FIGS. 1B and 1C also show horizontal stabilizer support poles 165 that are secured at their respective ends. In one embodiment, the horizontal stabilizer support poles 165 are secured to the vertical stabilizer anchor cuff and the horizontal stabilizer tip cuff. One embodiment of the vertical stabilizer anchor cuff is shown in FIG. 8A. One embodiment of the horizontal stabilizer tip cuff uses connector points, which in one embodiment is similarly configured as wing tip cuff depicted in FIG. 9.

Each of the ends of the horizontal stabilizer support pole is secured at the connector points located in the vertical stabilizer anchor cuff and the horizontal stabilizer tip cuff. In one embodiment, they are secured using a Ball Cap connection apparatus, such as that shown in FIG. 6. The way the vertical stabilizer cuff and horizontal stabilizer poles 165 interact is discussed further below.

Referring again to FIG. 1D, depicted is one embodiment of the support poles of the present invention, without the covering sheet material from the front view, showing left anchor and right poles 100, nose anchor pole 120 as previously discussed, along with main latitudinal support pole 150, main longitudinal support pole 145 and horizontal stabilizer support poles 165.

The support poles (including the anchor poles and base plate poles) described above are made from a very strong and yet lightweight material. Tube materials that can be used for the support poles include high grade 7075-T9 aerospace aluminum, such those manufactured by Easton Technical Products in Salt Lake City, Utah USA, which has one of the highest strength-to-weight ratios of any aluminum pole system available.

In the preferred embodiment, the support poles for the anchor poles are variable diameter poles to allow for different flexibility along their length. In the preferred embodiment support poles used for the rigid frame construction are manufactured from a high-performance graphite pole system, such as the carbon fiber material used in Easton's Carbon ION poles, which have a tensile strength of more than twice that of the 7075-T9 aluminum poles and are 59% lighter. The support poles are collapsible and adjustable, and in one embodiment incorporate an elastic internal silicon core shock cord, such as the SHOKCORD™ all weather material used in the Easton Carbon FX poles by Easton Technical Products, designed for harsh environmental conditions. The shock cord allows for the individual support pole segments which are designed to be used together, and are intended for a specific location within the frame structure, to stay together as a compact bundle, and then be quickly assembled into a single support pole. In the preferred embodiment, Airlock™ connectors from Easton are used with Easton Carbon ION poles that incorporate the shock cord to keep the pole segments together and snap together when the pole is assembled.

The total anchor pole length and support pole lengths required for the main longitudinal and main latitudinal support poles, once deployed into a single pole length, will depend on the particular aircraft type and dimensions. For high wing aircraft, such as the Cessna 182 shown in FIG. 1A, in which the base plates are secured using the aircraft's weight under the main wheels, the arc length of the anchor poles 100 will be greater to allow to pole to extend from the main wheel base plate poles 110 and over the wing. While the anchor pole length for a high wing aircraft using a main wheel base plate must be greater, the main longitudinal support pole 145 for a high wing aircraft has less of an arc so its length is less due to the cockpit and cabin of the aircraft being below the wing. The opposite would be true for a low wing aircraft, or for base plates affixed to the aircraft via tie down ports or wing struts as discussed infra, where the arc length of the anchor pole would be less due to the wings position on the aircraft, and the arc length of the longitudinal support pole would be greater to allow for positioning above the cockpit and cabin.

Figure 10:
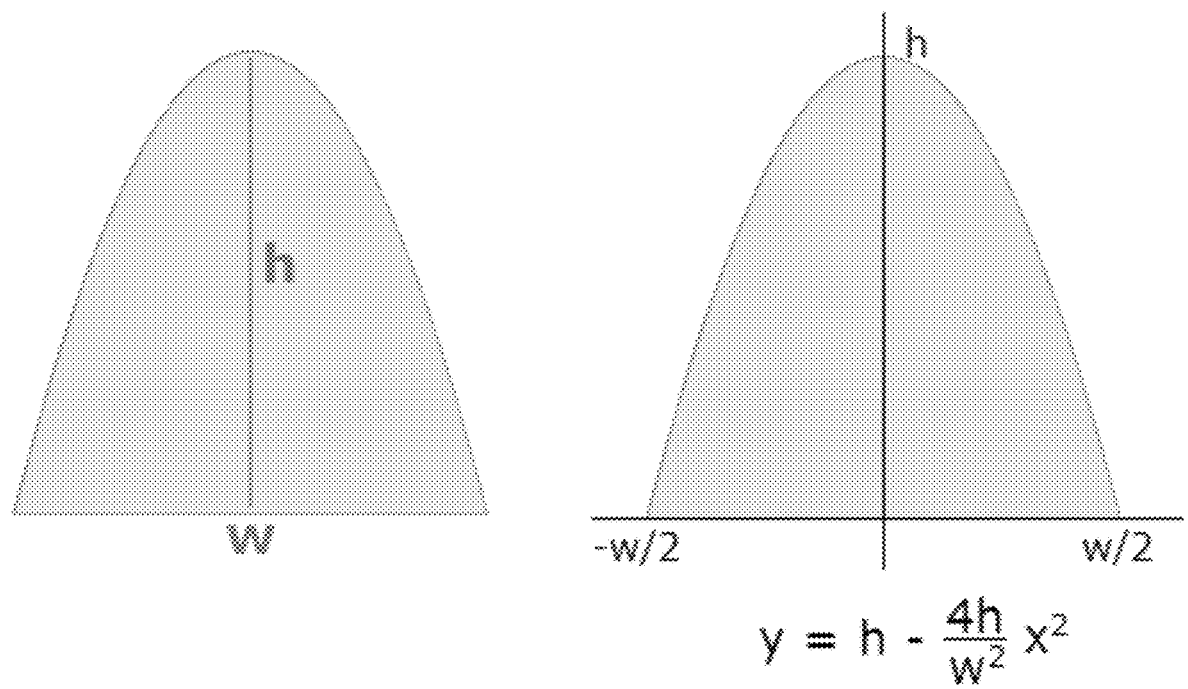
FIG. 10 is an illustration of the formula for calculating the length of the anchor poles and arc shaped support poles for any configuration.

One method of determining the length of the poles needed is using arc length segments of a parabola, and the measured dimensions of the aircraft. In one embodiment, the arc calculation should take into account exposed antennas fixed to the upper surface of the aircraft. FIG. 10 illustrates the formula for calculating the arc knowing width and height. This formula may be used to calculate the length of the anchor poles and support poles as discussed below.

Aligning the segment's axis of symmetry with the y-axis, the equation of the parabola is:

$$y = h - (4h/w^2)x^2$$

on the interval $[-w/2, w/2]$
which are equivalent to the base pole end points to which the anchor poles are attached.
Therefore:

$$\text{Arc Length} = 0.5 * \sqrt{16h^2 + w^2} + \left(\frac{w^2}{8h}\right) * \left(\text{Ln}\left(4h + \sqrt{16h^2 + w^2}\right) - \text{Ln}(w)\right)$$

Similar to the requirements for the support poles, the covering sheet material should be extremely lightweight, compact, and portable, as well as being strong to be effective in extreme weather. Material for the covering sheet that meets the stated requirements are the super lightweight fabrics such as double ripstop nylon with silicon coating, known as SilNylon™ from Cuben Fiber fabrics, or in the preferred embodiment woven ultra-high-molecular-weight (UHMW) polyethylene fiber marketed under the brand Dyneema® from Koninklijke DSM N.V.

Cuben Fiber, or non-woven Dyneema, is a non-woven, rip-stop, composite laminate made by sandwiching Dyneema fiber filaments a thousandth of an inch thick, in various arrangements between thin outer layers of a polyester film such as Mylar® of Dupont Teijin Films. The "sandwich" is then melded together in a high-pressure autoclave. These Dyneema composite fabrics are lightweight, highly durable, and are 50-70% lighter than Kevlar, four times stronger than Kevlar, and allow flex without losing strength. They also weigh less than SilNylon, they are 100% waterproof before being stitched, and have a high chemical and UV resistance.

Woven Dyneema fabric is made by spinning ultra-high-molecular-weight (UHMW) polyethylene fibers into full "yarns" and then weaving those "yarns" into a 100% woven fabric. Woven Dyneema fabric offers maximum breaking strength, abrasion resistance and cut resistance, and is the strongest, lightest and most durable and waterproof material currently used in the outdoor industry. As stated above, Dyneema threads are 50% to 70% lighter and 400% stronger than Kevlar, and 1500% stronger than steel per unit weight. The fabric will not stretch, thereby avoiding the need for guylines or other means of tightening the cover sheet material once deployed. It is also translucent, allowing for the aircraft below to be visible from above.

The typical properties of UHMW ("Dyneema") are shown in Table 1 below:

| ASTM or UL test | Property | UHMW |
|---|---|---|
| D792 | Density (lb/in$^3$) | 0.034 |
| | (g/cm$^3$) | 0.93 |
| D570 | Water Absorption, 24 hrs (%) | <0.01 |

-continued

| ASTM or UL test | Property | UHMW |
|---|---|---|
| D638 | Tensile Strength (psi) at 72° F. | 5,800 |
| D638 | Tensile Strength (psi) at 150° F. | 400 |
| D638 | Tensile Modulus (psi) | 80,000 |
| D638 | Tensile Elongation at Break (%) | 300 |
| D790 | Flexural Strength at Yield (psi) | 3,500 |
| D790 | Flexural Modulus (psi) | 88,000 |
| D695 | Compressive Strength (psi) | 3,000 |
| D695 | Compressive Modulus (psi) | 80,000 |
| D732 | Shear Strength (psi) | 3,000 |
| D785 | Hardness, Shore D | D62-D66 |
| D256 | IZOD Notched Impact (ft-lb/in) | No Break |
| D696 | Coefficient of Linear Thermal Expansion ($\times 10^{-5}$ in./in./° F.) | 11 |
| D648 | Heat Deflection Temp (° F./° C.) | |
| | at 66 psi | 203/95 |
| | at 264 psi | 180/82 |
| D3418 | Approx. Melting Temperature (° F./° C.) | 275/136 |
| — | Max Operating Temp (° F./° C.) | 180/82 |
| C177 | Thermal Conductivity | |
| | (BTU-in/ft$^2$-hr-° F.) | 2.84 |
| | ($\times 10^{-4}$ cal/cm-sec-° C.) | 10.0 |
| UL94 | Flammability Rating | HB |

"Denier" is the unit of density used in determining the thickness of fibers used in sheet material that is based on the length and weight of a fiber. The letter "D" is used in the numbering system for fabrics to designate denier, with lower numbers indicating lighter and finer fibers, and higher numbers indicating heavier and coarser fibers. A single strand of silk is considered 1 denier. The fibers in a 40-denier nylon fabric have over 6.5 times the diameter of the silk strand, and almost 1.5 times the diameter of fibers in a 20-denier or "20D" nylon fabric. The types of fabrics and the thickness the fabric, is as follows:

200 Denier Coated Oxford Nylon Fabric
    Fabric Thickness: 0.006 inches (0.15 mm)
7 Denier Ultra-Light Coated Rip-stop Nylon Fabric
    Fabric Thickness: 0.0013 inches
30 Denier Double Silicon Coated Rip-stop Nylon Fabric
    Fabric Thickness: 0.003 inches (0.08 mm)

In one embodiment, the thickness range for the sheet material is Between 0.0013 inches to 0.006 inches. Once the surface area of the covering sheet material is known the thickness range can be used to determine the overall weight of the sheet material. In one embodiment, non-woven Dyneema fabric is used. However, as new materials are developed, the aircraft cover could be made utilizing even thinner and stronger materials.

Figure 2:
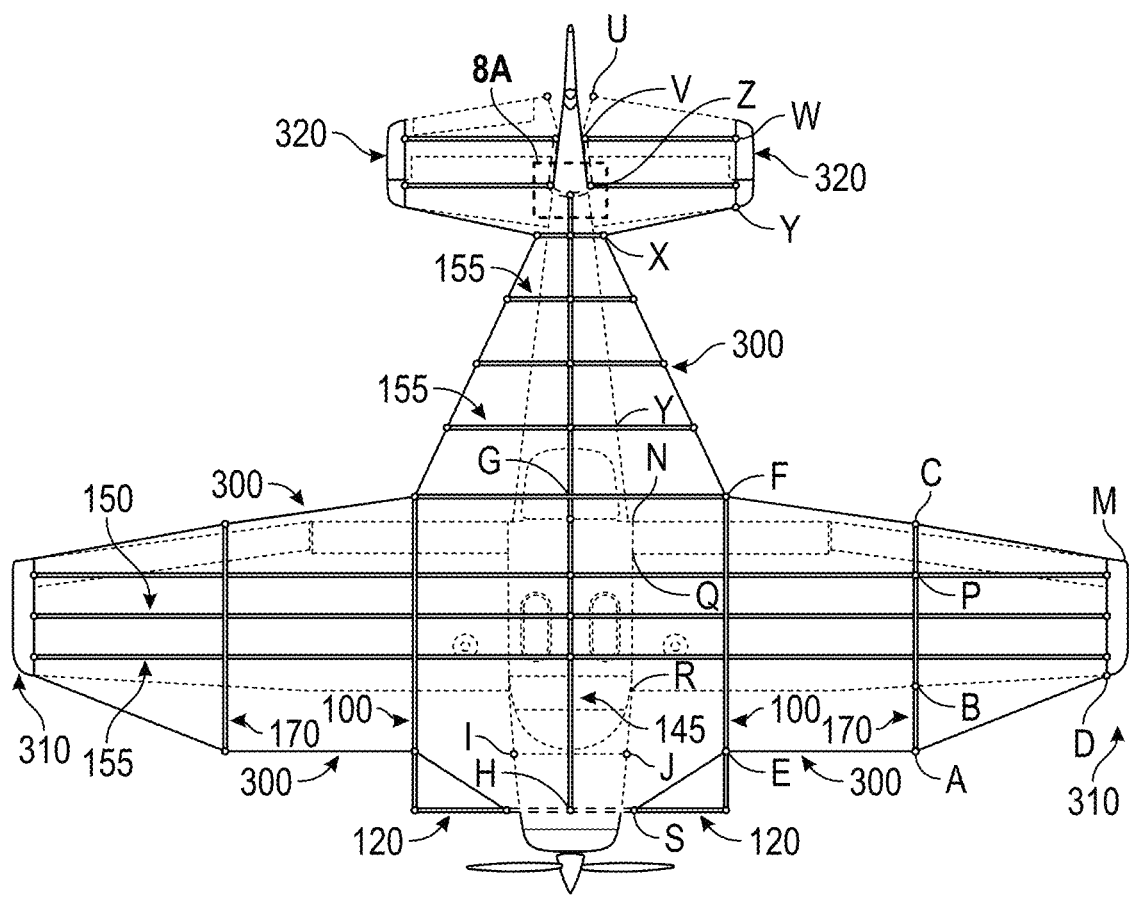
FIG. 2 is a plan view of an embodiment of the sheet material cover in use on a Cessna 182 aircraft, with specified points along the left half of the airplane's fuselage used to calculate the surface area of the sheet material.

The wing span for the Cessna 182 is known to be 36 feet and 0 inches. The approximate scale between the FIG. 2 illustration and the actual aircraft can be determined based on a comparison of the drawing measurement and the actual wingspan. The wingspan of 36 feet (actual)=432 inches (actual)=7.8125 inches (FIG. 2)=432 inches, yielding a scale of 1:55.3

Referring now to FIG. 2, an elevated plan view of one embodiment of the sheet material deployed covering a Cessna 182 airplane is shown. FIG. 2 shows the accompanying support poles or anchor poles and their orientation with respect to the cover sheet material. Various points at intersections of the support poles and the edge of the sheet material along the right longitudinal half of the airplane in FIG. 2 are indicated by upper case letters and used in determining the approximate surface area of the sheet material of the present invention used to cover a Cessna 182.

Using the designated upper case points the approximate area of the following figures can be calculated using the scale determined above:

Rectangle QRMD: (193.55 in)(55.3 in)=10,703.3 in$^2$
Rectangle ABRJ: (109.5 in)(27.65 in)=3,027.7 in$^2$
Triangle ABD: ½(27.65 in)(82.9 in)=1146.8 in$^2$
Triangle SEJ: ½(44.9 in)(20.7 in)=465.55 in$^2$
Triangle PCM: ½(81.5 in)(13.8 in)=563.4 in$^2$
Rectangle PCNQ: (103.7 in)(13.8 in)=1433.7 in$^2$
Triangle NFX: ½(103.7 in)(48.4 in)=2508.9 in$^2$
Rectangle VWYZ: (65.7 in)(34.56 in)=2270 in$^2$
Triangle ZXY: ½(10.4 in)(55.3 in)=1150.3 in$^2$
Triangle UVW: ½(65.7 in)(13.8 in)=454.2 in$^2$
Rectangle GNSH: (20.7 in)(110.6 in)=2290.0 in$^2$
Triangle GNX: ½(20.7 in)(110.6 in)=1144.8 in$^2$
Total surface area of the right half of the sheet: 27,159.3 in$^2$ Thus, the total approximate surface area of a cover sheet for a Cessna 182 is 54,318.5 in$^2$.

Applying the given density of Dyneema (UHMW) from Table 1 as 0.034 lbs/in$^3$ for the fabric thickness ranges of 0.0013 inches to 0.006 inches for the sheet material of the present invention comprising the Dyneema fabric gives the following ranges in weight:

0.006 in: (54,318.5 in$^2$)(0.006 in)(0.034 lbs/in$^3$)=11.08 lbs
0.003 in: (54,318.5 in$^2$)(0.003 in)(0.034 lbs/in$^3$)=5.54 lbs
0.0013 in: (54,318.5 in$^2$)(0.0013 in)(0.034 lbs/in$^3$)=2.4 lbs Similarly, the total length of the support poles, base plate poles and anchor poles used to support the cover sheet. Using FIG. 2 measurements and the scale of 1:55.3, the wing support poles have a total length=(30.51 in.)(55.3)=1686.98 in.

For the length of the wing anchor poles, the actual specification height of a Cessna 182 is 9 ft 4 in or 116 in. Using the formula in FIG. 10, and approximating the arc height (h) as being 128 in., using the measured anchor pole base from FIG. 2 and applying the scale of 1:55.3 to determine 104 in as the base distance (w) yields: wing anchor pole arc length: 353.4 in. (706.8 in. for both).

Applying the same approach to the nose anchor pole, and approximating the arc height (h) to be 72 in. and using a base distance (w) of 90 in. yields: nose anchor pole arc length: 202.8 in.

Adding the total length of the wing support poles, the base plate poles (using the above referenced scale), and the anchor poles yields a total of 2890.6 in of cumulative pole length. Applying this total length to an example carbon fiber pole such as a Fibrapole 292 manufactured by Fibraplex of Celina Tenn. USA which has an outside diameter of 0.292 in. and weighs 0.02 oz/in., yields a total approximate weight of 57.8 oz or 3.6 lbs.

Based on the above calculations the supporting poles and cover sheet material, in a preferred embodiment, would have a total weight of approximately 6 pounds, which is equivalent to 1 gallon of aviation gasoline (AvGas is designated for weight and balance calculation purposes for pilots as being 6 lbs/gal). In other words, the operational cost to carry the aircraft cover in the aircraft to protect the aircraft when it is used away from it home base, is minimal. The operator can load 1 less gallon of fuel onboard the aircraft or carry 6 pounds less baggage.

In one embodiment, the entirety of the aircraft cover configured for a single engine aircraft such as a Cessna 182, including base plates, poles, cover sheet, and pack is designed to have a packaged weight under 10 pounds. Referring now to Appendix 1, the wingspan, height and length of many different fixed wing aircraft, is shown, ranging from single engine aircraft such as those manufactured by Cessna and Beechcraft, to business jets manufactured by Lear and Gulfstream. As outlined in the listing set forth in Appendix 1, the physical dimensions of most single engine aircraft are similar to that of the Cessna 182, in terms of wingspan, height and length. As a result, the package weight for the aircraft cover for most single engine aircraft is anticipated to be in the same preferred range of under 10 pounds. In addition, the dimensions of the light twin engine Cessna aircraft in Appendix 1 is similarly close to that of the single engine aircraft. For example, a Cessna 310Q has the following dimensions: wingspan=36 ft, 8 in. (+8 in. compared to a 182); height=10 ft, 6 in. (+12 in. compared to a 182); length=29 ft, 6 in (+6 in. compared to a 182). Therefore, the packaged weight for a Cessna 310 is anticipated to be no more than 1 pound more than the packed weight for a single engine aircraft. As those skilled in the art will appreciate, from the dimensions shown for general aviation aircraft in Appendix 1, in comparison to the aircrafts size and usable load, the aircraft cover set forth herein will be a very small fraction of the overall load carrying capability of the aircraft. Of course, it should be understood that the same configuration may also be used in larger and smaller aircraft.

Figure 3:
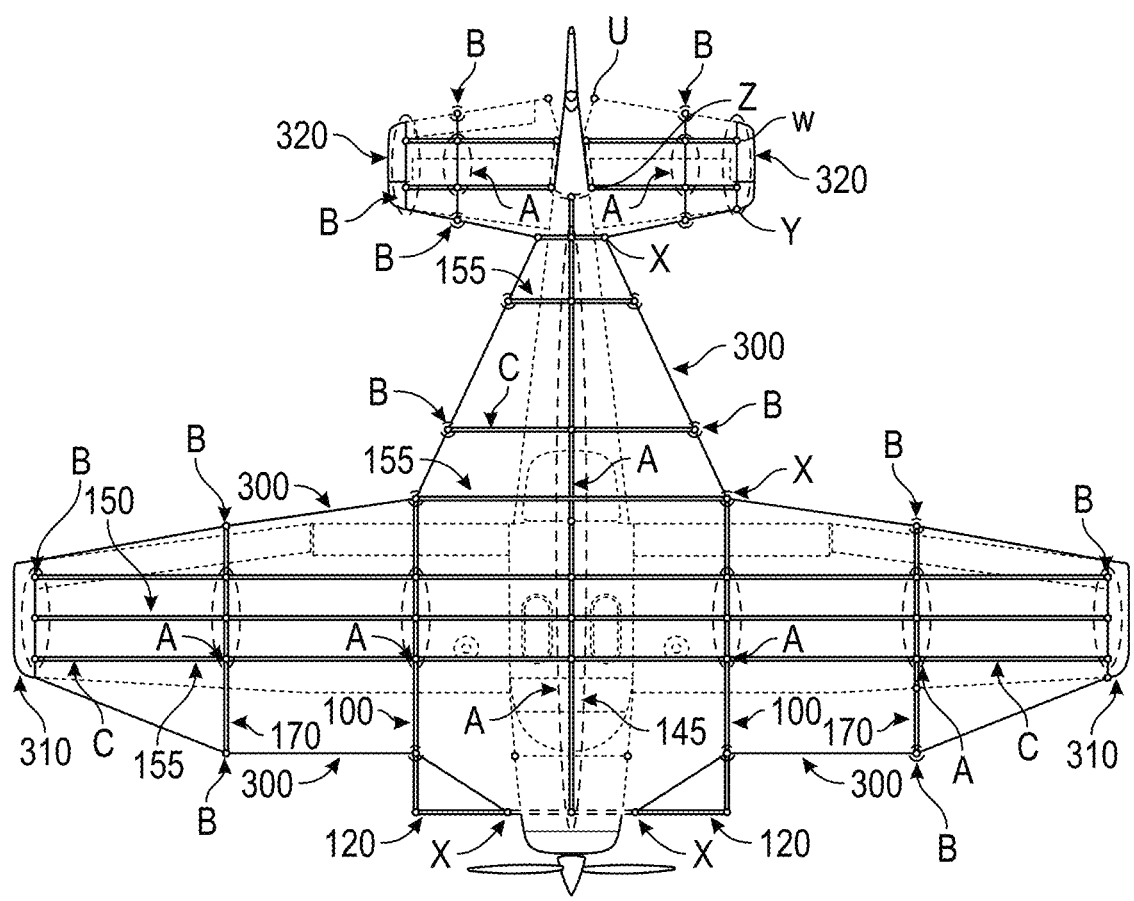
FIG. 3 is a plan view of an embodiment of the sheet material cover in use on a Cessna 182 aircraft, showing the connection points of the anchor poles and support poles used to support the sheet material of the present invention.

Referring now to FIG. 3, an elevated plan view of an aircraft is shown depicting the sheet material 300 as suspended from the anchor poles and support poles. The types of connectors which may be used are indicated as type A, type B, and type C.

In one embodiment, connector type A is an intersection hub connector, attached to the sheet material, that locks the main longitudinal support poles 145 and supplemental wing longitudinal support poles 170 with main latitudinal support pole 150, and supplemental lateral support poles 155 as they span the wing and fuselage, and where support poles 150 and 155 intersect with main anchor poles 100 and where anchor pole 100 intersects with nose anchor pole 120. The connector A, in one embodiment, can be a Clip-Loc™ type connector as shown in FIG. 4A manufactured by Sierra Designs of Boulder, Colo., a Swivel Hub™ connector also distributed by Sierra Designs. Press fit hub connectors, such as the LightWedge™ from Mountain Hardware of Richmond, Calif. could alternatively be used as Connector A, or a combination of a Clip-Loc type connector, a Swivel Hub connector and a LightWedge type hub connector can be used. Alternative hub connector types may also be used.

Figure 5:
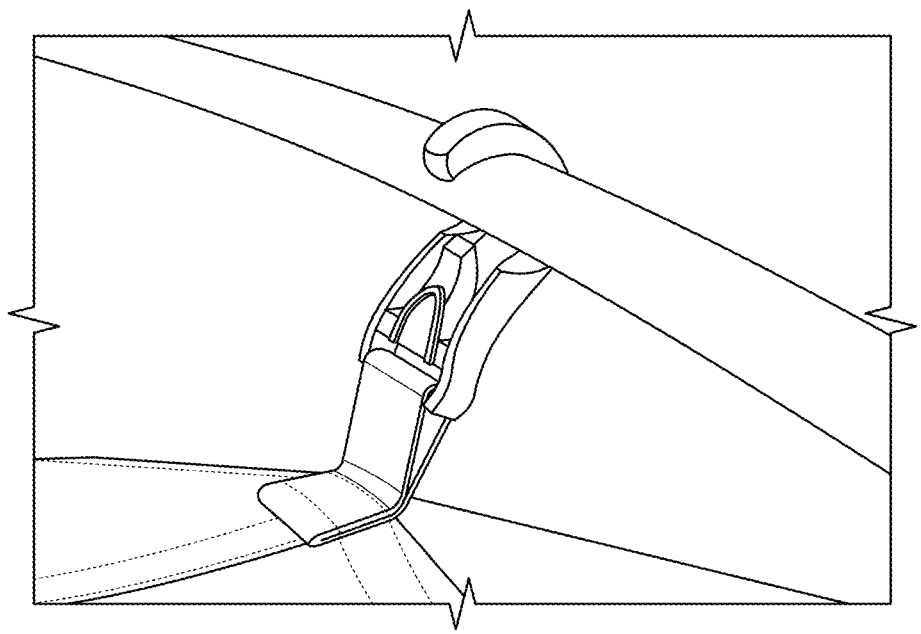
FIG. 5 depicts one embodiment of a clip type connector which may be used to secure the sheet cover material to the anchor poles and support poles.

Connector type C is a clip type fastener attached to the sheet material that may be used in one embodiment to connect the sheet material 300 to the support poles and anchor poles, as shown in FIG. 3 where there is not an intersection of support poles where the type A connectors are used. An exemplary C-type connector is shown in FIG. 5. In one embodiment, multiple type C connectors are used to secure the cover sheet material to the support frame as illustrated in FIG. 1A (where the number 5 references FIG. 5), and not all the connectors are depicted in FIG. 3 to render the drawing easier to view. Alternative connector type C configurations may be used to couple the cover sheet material to the support pole members.

Referring again to FIG. 3, in one embodiment connector type B is incorporated into the sheet material and is used in one embodiment to secure the ends of the support poles 145, 150, 155, (as well as 160 and 165 in FIG. 1C) and 170 to the peripheral edges of the sheet material 300. These edges may include the wing tip cuff 310, and the cuff edges of the horizontal stabilizer 320, as shown in FIG. 3. One embodiment of connector type B is shown in FIG. 6. In one embodiment, the connector type B is a Ball Cap™ type end connector as shown in FIG. 6 and is distributed by Nemo Equipment, Inc. of Dover N.H. In this connector design a ball tip snaps into place to secure the pole, without the use of a separate grommet or other anchoring means, and allows for free rotation of the ball tip in high wind conditions without releasing the support pole. Alternatively, a locking pole tip design can be used wherein a separate grommet is used to lock the pole tip into place. Other mechanisms may also be used, in addition or instead of those described.

Figure 9:
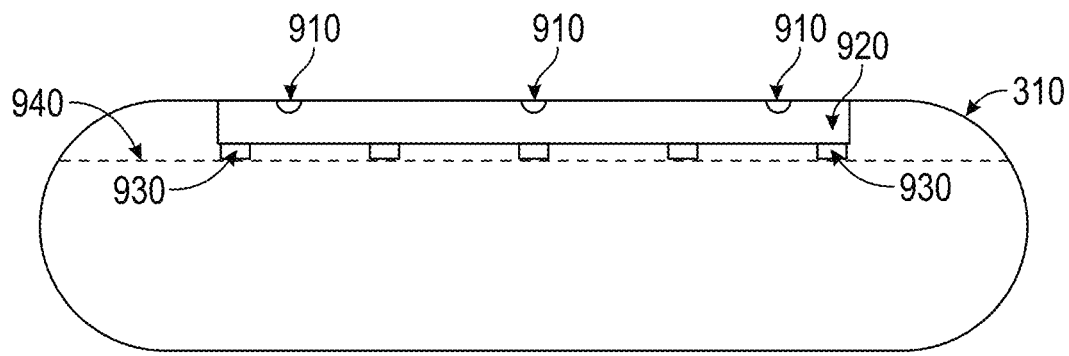
FIG. 9 is a side view of one embodiment of the interior of the wing tip/horizontal stabilizer cuff portion of the sheet material, depicting the internal elements that would act as a buffer between the wing surface area and horizontal stabilizer surface area being covered and the cuff.

FIG. 9 is one embodiment a side view of the interior of the wing tip cuff and horizontal stabilizer cuff of the sheet material, showing the ports 910 to secure the ends of the support poles. In one embodiment, the cuffs also include a flexible partition 920 to act as a barrier between the aircraft surface 940 and the sheet material 310. The flexible partition 920 can move to a position parallel to the sheet material when not in use and then be extended and locked into place to come into contact with the aircraft/wing surface when in use. Attached to the flexible partition 920 are buffer points 930 made of a soft material, such as neoprene, that allows for secure biasing against the wing/aircraft surface, but also not scratch or mar the surface paint. In one embodiment, the flexible partition is made of a carbon fiber material for its light weight and strength, but it could also be made from emulsion styrene-butadiene rubber such as that used in vehicle tires. It is understood by those skilled in the art that other means of separating the aircraft surface from the wing tip cuff can be implemented in the interior of the cuff to minimized the contact between the wing tip cuff material and the aircrafts wing tip and horizontal stabilizer tip surfaces.

Referring now to FIG. 8A, one embodiment of a vertical stabilizer anchor cuff 840 is shown. The vertical stabilizer anchor cuff 840 is used to provide an attachment point for the sheet material 300 to the vertical stabilizer 800 of the aircraft. The cuff form fits around the leading edge 810 of the aircraft's vertical stabilizer 800, taking advantage of any increasing width of the vertical stabilizer 850 as it comes closer to its attachment point to the aircraft fuselage, and being flexible and stretched around the stabilizer, to allow for a secure biasing against the vertical stabilizer. As with the main wing portion of the aircraft, in one embodiment, support poles 165 have their ends inserted into ports 820 incorporated into vertical stabilizer anchor cuff 840.

Figure 8B:
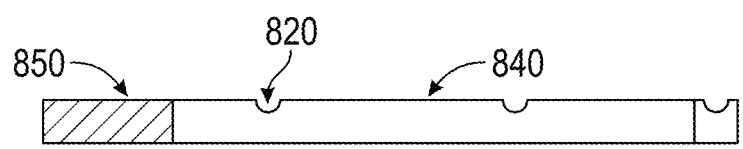
FIG. 8B is a side view of one embodiment of the vertical stabilizer cuff showing the attachment straps sued to secure the cuff to the vertical stabilizer.

FIG. 8B depicts a side view of one embodiment of the vertical stabilizer anchor cuff 840, showing a securing mechanism 850, that can be used to wrap around the vertical stabilizer, between the gap in between the vertical stabilizer and the aircraft's rudder, to securely bias the anchor cuff 840 to the vertical stabilizer. Multiple straps may be employed in extreme weather and high wind conditions.

The anchor cuff in one embodiment incorporates type B connector points 820 to engage and secure horizontal stabilizer support poles 165, and longitudinal support pole 145 (and supplemental longitudinal support poles 160 as shown in FIG. 1C). The anchor cuff can be incorporated into the sheet material 300, in one embodiment. In another embodiment, the anchor cuff may be attached via a zipper, hook and loop, or other mechanism to the sheet material along the periphery 830 of the anchor cuff as shown in FIG. 8A. The zipper is preferably made from the same material used for the sheet material and designed as a one way separating-water resistant coil zipper.

In an alternative embodiment, rather than having the base plates anchored using the aircraft's weight, the base plates are affixed to the aircraft through the use of a clamp or other mechanism attached to the aircraft itself. In FIG. 11 alternative base plate 1100 is shown attached to the wing strut 1110 of an aircraft with wing struts. A supporting attachment interface 1120 is shown. The interface 1120 is affixed to alternative base plate 1100 on one side as shown, and has a curved interior surface on the other side to directly conform to the curvature of the wing strut. Like the base plate, the supporting attachment is preferably made from a carbon fiber material to allow for greater strength and minimal weight. The contact surface of attachment interface 1120 incorporate a soft material (for example polychloroprene also known as neoprene) padding that interfaces with the wing strut and helps to secure the clamp to the wing strut surface, while preventing any scratching of the surface paint of the strut. The contact surface of the supporting attachment interface 1120 is affixed to strapping clamps 1130 which are attach securely to the wing strut, either through the use of latch toggle type of locking mechanism 1140, such as those manufactured by ClampTek USA Inc., of Brea, Calif., or through the use of hook and loop, or other attachment mechanisms to securely affix alternate base plate to the wing strut, but allow for fast and easy attachment and removal.

In another embodiment, the aircraft's internal tie down fittings are used as an anchor point for base plates. Tie down fittings are generally part of every aircraft design, and used to anchor aircraft (via ropes and/or chains) to their tie down location. These tie down fittings are located in the underside of the wing of the aircraft, generally between the main wheels and the wing tip. For high wing aircraft having a strut configuration, the tie down fittings are usually located at the wing-strut interface as shown in FIG. 12.

Figure 12:
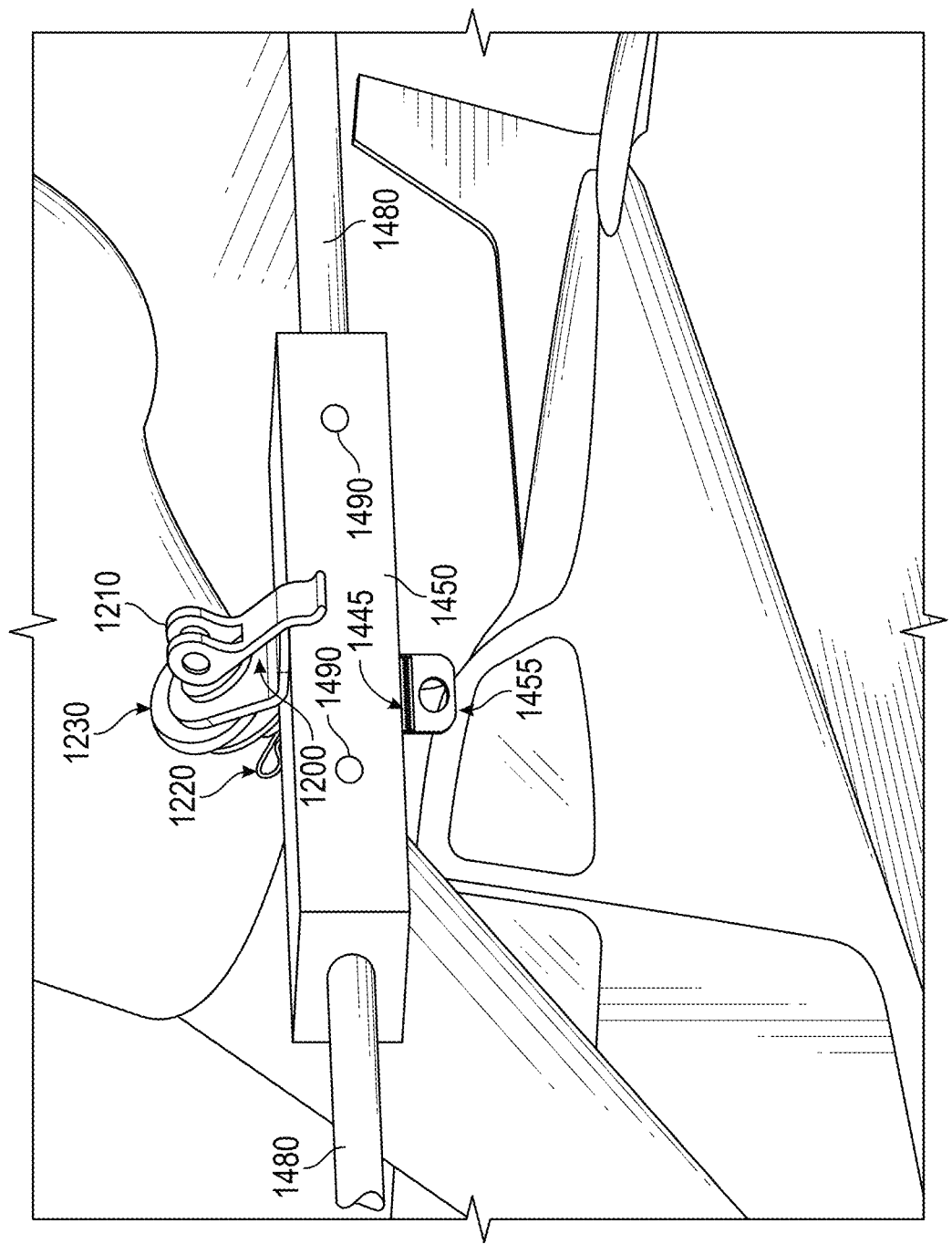
FIG. 12 is an oblique lower view of an aircraft wing strut depicting another embodiment of a clamp configuration, in which the aircraft's internal tie down hook is used as the attachment point for the clamp and base plate.

Referring to FIG. 12, a bracket 1200 manufactured preferably from carbon fiber for increased strength and minimal weight, is affixed to the aircraft's tie down fitting. In one embodiment, this may be done by use of an anchor pin 1210 inserted through the upper part of the bracket and through the tie down fixture, and then secured by use of a ball lock pin 1220, or other securing means. The bracket may be of similar design as those used to mount cameras as manufactured by MyPilotPro, of Newtown Pa.

In one embodiment, buffer material 1230 such as neoprene is inserted between the bracket 1200 and the wing-tie down fixture interface to ensure that bracket 1200 is securely attached to the aircraft, and protect the wing from being scratched or otherwise damaged by the bracket 1200.

To ensure the aircraft can still be tied down, an attachment point 1455 similar to the aircraft's tie down point can be incorporated to the bottom of alternative base plate 1450 to allow the aircraft operator to use the parking tie-down while also using the aircraft cover. In one embodiment, attachment point 1455 incorporates a spring hinge 1445 or other such device to allow the attachment point 1455 to be folded flat against the alternative base plate 1450 when not in use.

Figure 13:
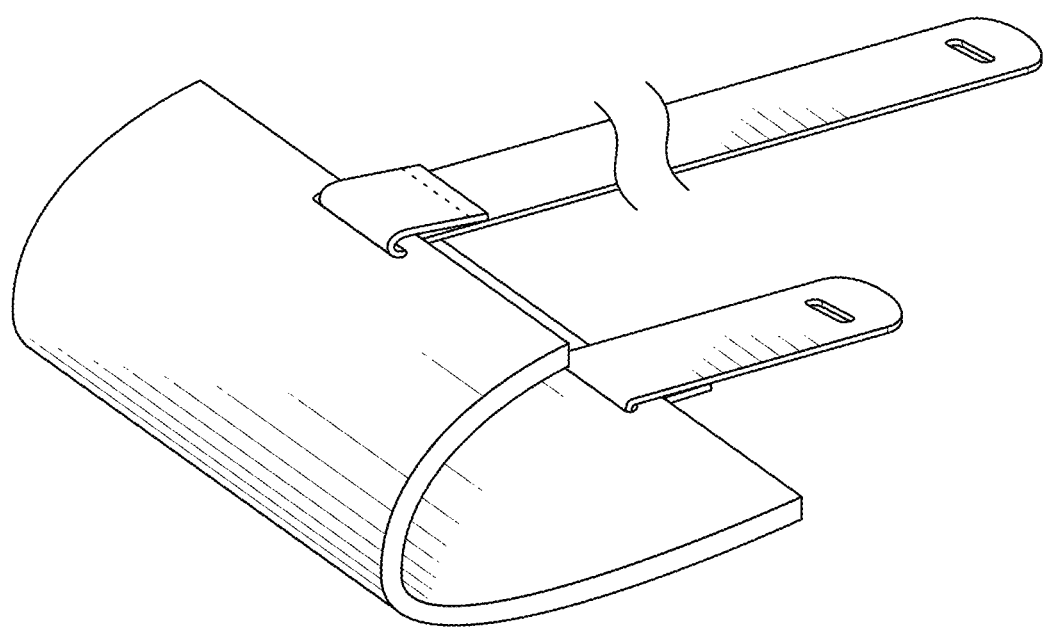
FIG. 13 depicts one embodiment of a cuff that can be attached to the leading edge of the aircraft's wing that is used as a base plate attachment for an aircraft that does not incorporate structural wing struts.

In another embodiment, a strut mount can be configured as a wing mount or wing clamp affixed to the leading edge of the aircraft's wing to attach the alternative base plate to the underside of the aircraft wing itself. FIG. 13 shows one embodiment of a strut mount configured to fit over the leading edge of the aircraft's wing. An exemplary strut mount is the camera mount manufactured by WingitMounts of Midland Mich. Like the other alternative clamping designs, the wing mount or wing clamp is preferably made from a carbon fiber material due to its high strength and low weight. An example of such a wing mount is depicted in FIG. 14B, where a side view of a NACA 2412 airfoil 1400, as used in a Cessna 182, is shown with wing clamp 1410, such as that depicted in FIG. 13, attached. Wing clamp 1410 forms over the leading edge of the aircraft wing, and has a buffering layer attached to its inner surface to allow for a secure form fit to the leading edge of the wing's surface while also protecting the leading edge from scratching or marring of the painted surface. In one embodiment, wing clamp 1410 has a strap 1420 that attaches to the top of the wing clamp 1430 by means of a hook and latch combination, or use of another quick and easy attachment means such as hook and loop. Strap 1420 traverses wing 1400 and in one embodiment is routed through the gap of the wing-flap interface 1440 of the aircraft. For those aircraft that do not incorporate flaps, the strap can be routed through the gap of the wing-aileron interface, on one embodiment. The bottom of wing clamp 1460 in one embodiment incorporates a latch interface that connects directly to base plate 1450 and the mating latch mechanism 1470 as shown in FIG. 14C. Alternatively the wing clamp can be attached to the base plate via a strap, like strap 1420. In one embodiment, the wing clamp may have a latch mechanism on both ends for connecting the wing clamp to front face of the base plate. As depicted in FIG. 14B, and as described in other embodiments for affixing the base plate, base plate poles 1480 extend beyond the wing and include attachment points 1495 for the anchor poles.

Referring to FIG. 14C, the base plate 1450 is shown with front latch mechanism 1470, rear latch interface 1475 and base plate poles 1480 depicted. As similarly described for FIGS. 7C and 7D discussed infra, base plate poles 1480 are shown inserted into base plate 1450, which has side ports 1490 through the base plate. Similar holes are incorporated into base plate poles 1480 such that when they align with side port holes 1490, a pin can be inserted to secure the base plate poles in place. As in the previous embodiments, a latch/grove combination as depicted in FIG. 7D may also be incorporated into base plate 1450.

Figure 14A:
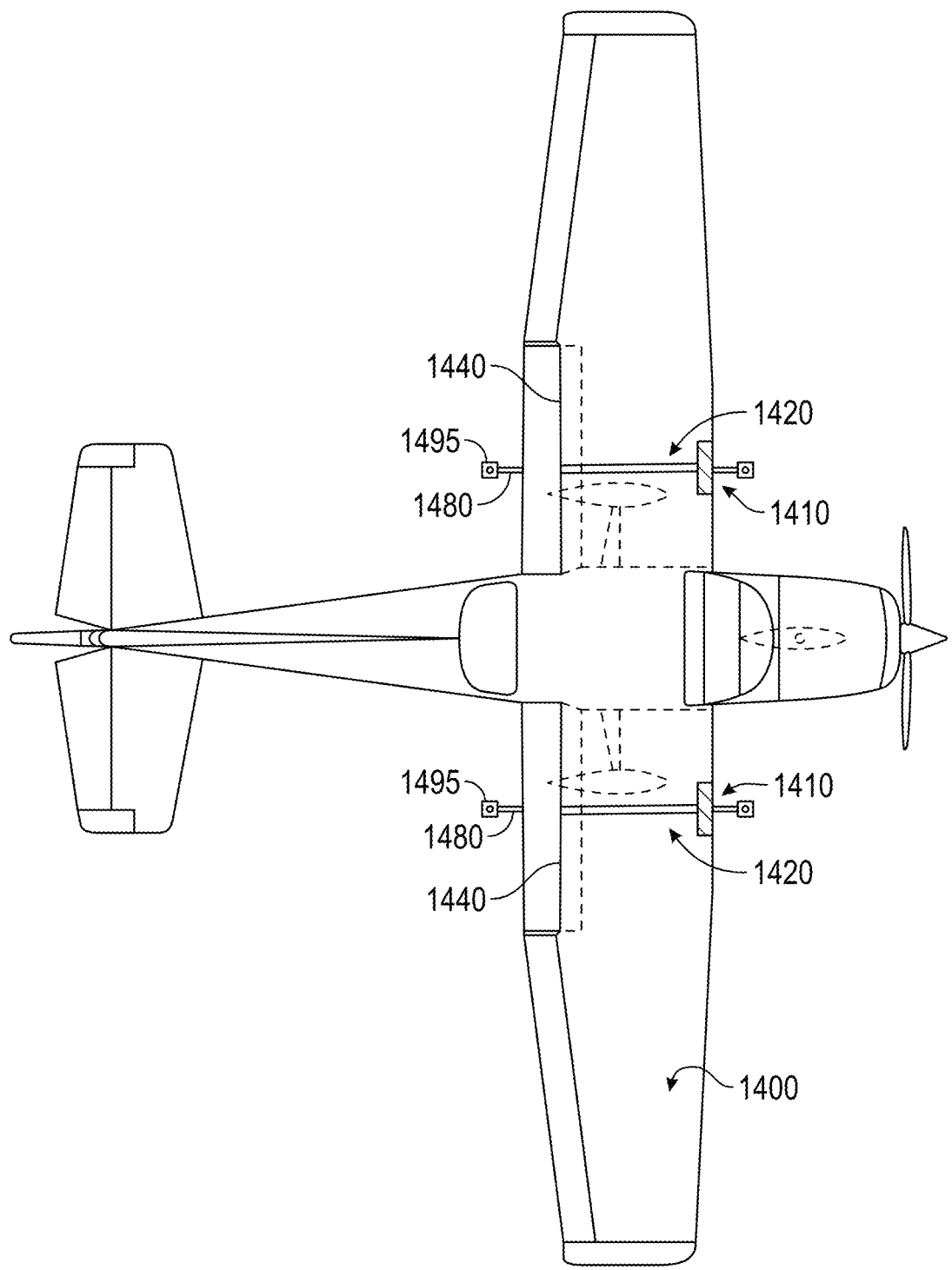
FIG. 14A is a plan view of an aircraft depicting one embodiment of a base plate attachment in which the cuff shown in FIG. 13 is used to secure the base plate to the underside of an aircraft wing.
Figure 14B:
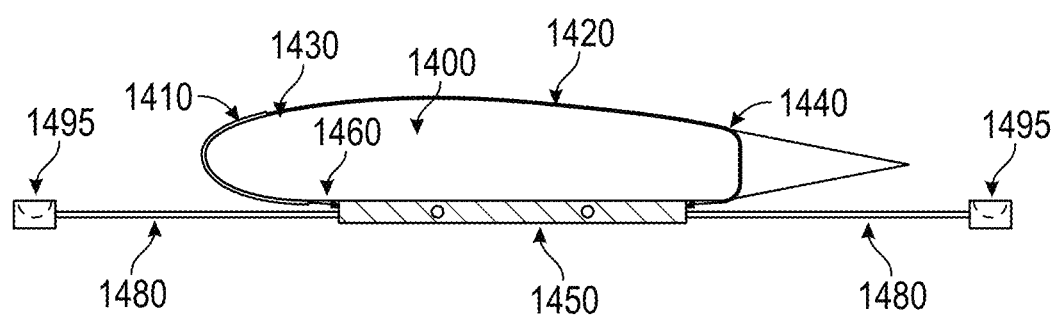
FIG. 14B is a side view of the aircraft's wing depicted in FIG. 14A, showing one embodiment of the base plate attached to the wing using the cuff depicted in FIG. 13.
Figure 14C:
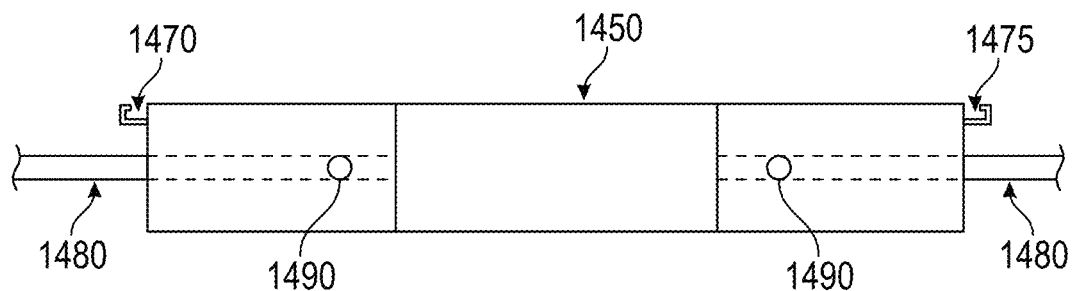
FIG. 14C is a close-up side view of the base plate in FIG. 14B depicting another embodiment of the attachments used to secure the base plate to the wing cuff shown in FIG. 13.

In FIG. 14A, an elevated plan view of an aircraft is shown with wing clamp 1410 affixed to strap 1420 which is routed through the wing-flap interface gap 1440 on each wing of the aircraft. Base plate poles 1480 incorporation anchor pole attachment points 1495 are also shown.

Figure 14D:
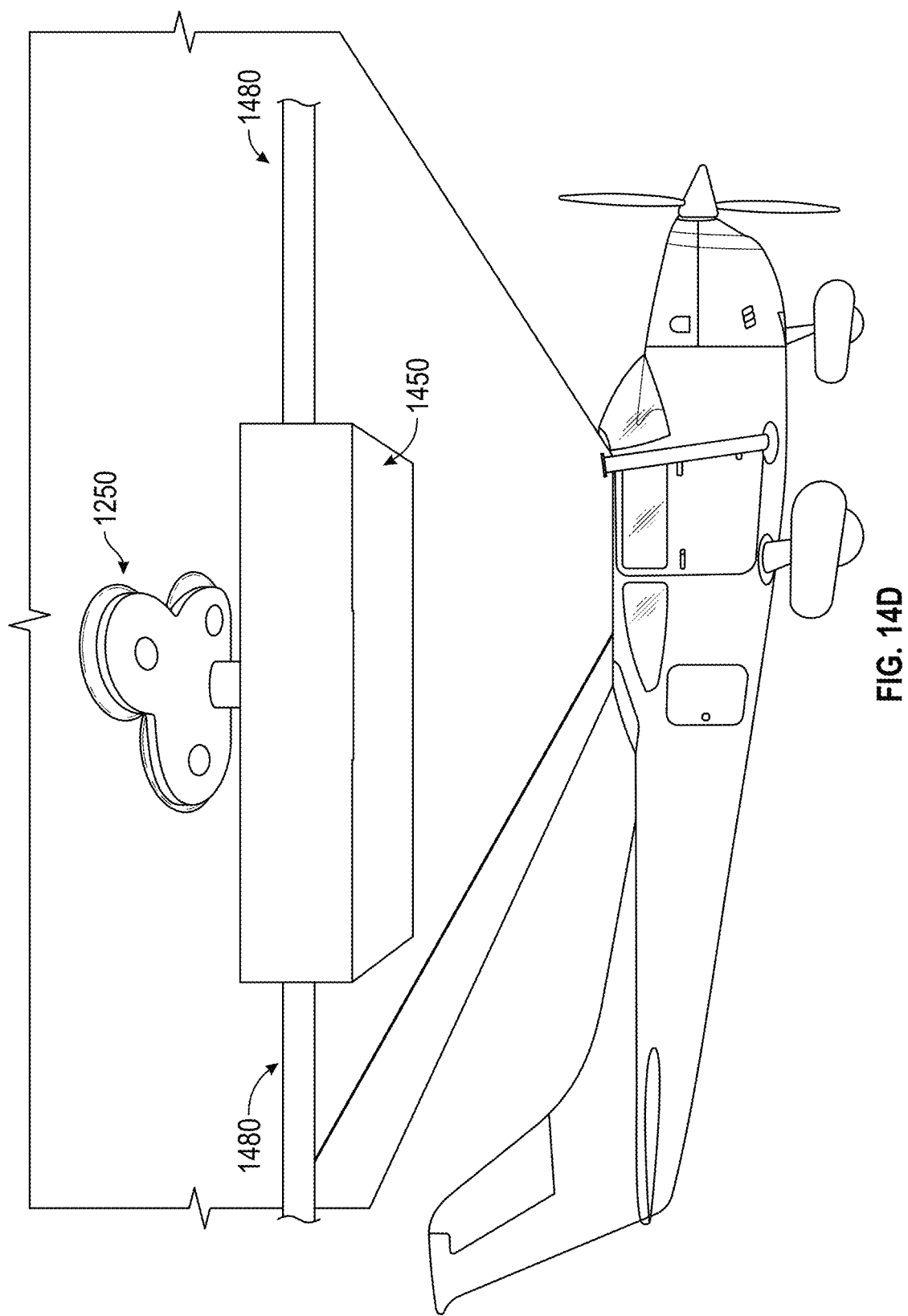
FIG. 14D is an underwing side view depicting another embodiment of securing the base plate to the underside of the aircraft's wing, using a suction cup device.

In a further variation, a suction cup 1250 or similar mechanism that uses negative fluid pressure of air to adhere to nonporous surfaces, can be used as an anchor point for a base plate, as shown in FIG. 14D. Such a suction cup may replace the wing clamp/strap combination on the airfoils leading edge to secure the base plate, or may act as an anchor clamp affixed to a tie down fitting. A suction mounted clamp such as a BRLS Removable mount as manufactured by BRLS Hawaii, may be affixed to the underside of the wing and act as the anchor point for the alternative base plate 1450 and base plate poles 1480 as shown in FIG. 14D.

Figure 15A:
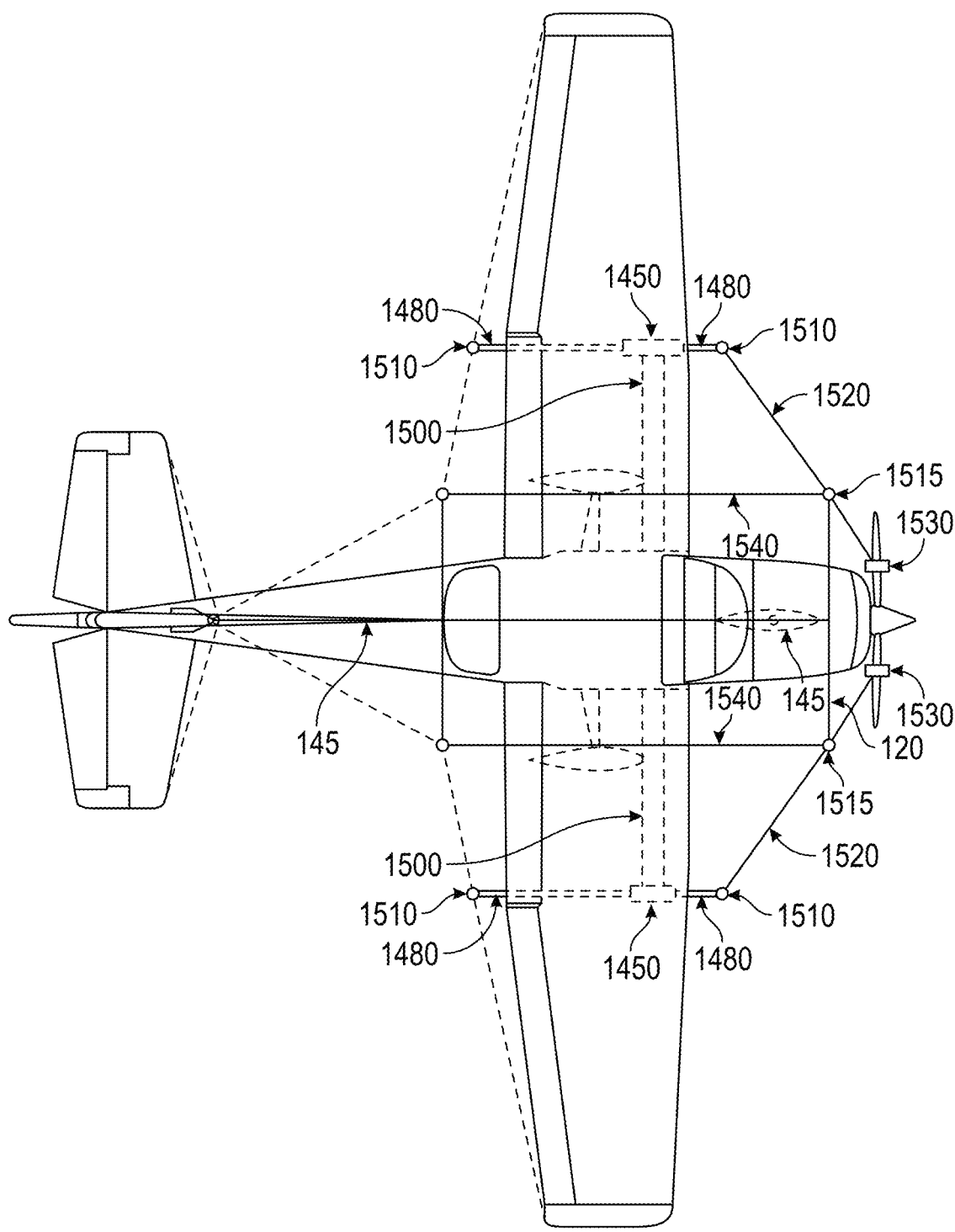
FIG. 15A is a plan view of an aircraft depicting one embodiment of a wing mounted base plate and support pole configuration utilizing a propeller mounted clamp for securing the support poles.

FIG. 15A illustrates a top view of a plane including a strut-mounted base plate. The strut mounted base plate 1450, attached to the aircraft as depicted in FIG. 12, is shown attached to aircraft strut 1500. The base plate poles 1480 are inserted into base plate 1450. The system includes, in addition to anchor pole attachment points (not shown), a connector 1510 which can be a Ball Cap connector, as shown in FIG. 6, a hub connector as shown in FIGS. 4A and 4B, or other securing apparatus, such as a locking pole tips used in conjunction with a grommet. In this strut mounted base plate configuration, in which no wheel base plates are used, support pole 1520 incorporates within its length a connector junction 1515. In one embodiment, the connector junction 1515 is the same as connector 1510, other than being located along the support pole length rather than at its ends. In one embodiment, support pole 1520 is secured to a clamp mount 1530, which is similar in design to those described in connection FIG. 11, except smaller. The clamp mount 1530 is secured to each side of the aircraft propeller and close to the propeller hub, in one embodiment. In one embodiment, the ends of nose anchor pole 120 are attached to support pole 1520 at connector 1515 rather than to a nose base plate pole. As with the other embodiments, nose anchor pole 120 attaches to longitudinal support pole 145. In one embodiment connector 1510 is configured with two anchor points, such as those shown in FIG. 7B, to secure wing anchor poles 100 (shown for clarity in FIG. 15B) and support pole 1520. Connector 1515 also has two anchor points to secure nose anchor pole 120 and support pole 1540, which gives the configuration rigidity. The dotted lines in FIG. 15A illustrate the cover sheet material for the aft section of the aircraft only to allow for a better view of the support pole configuration as described.

Figure 15B:
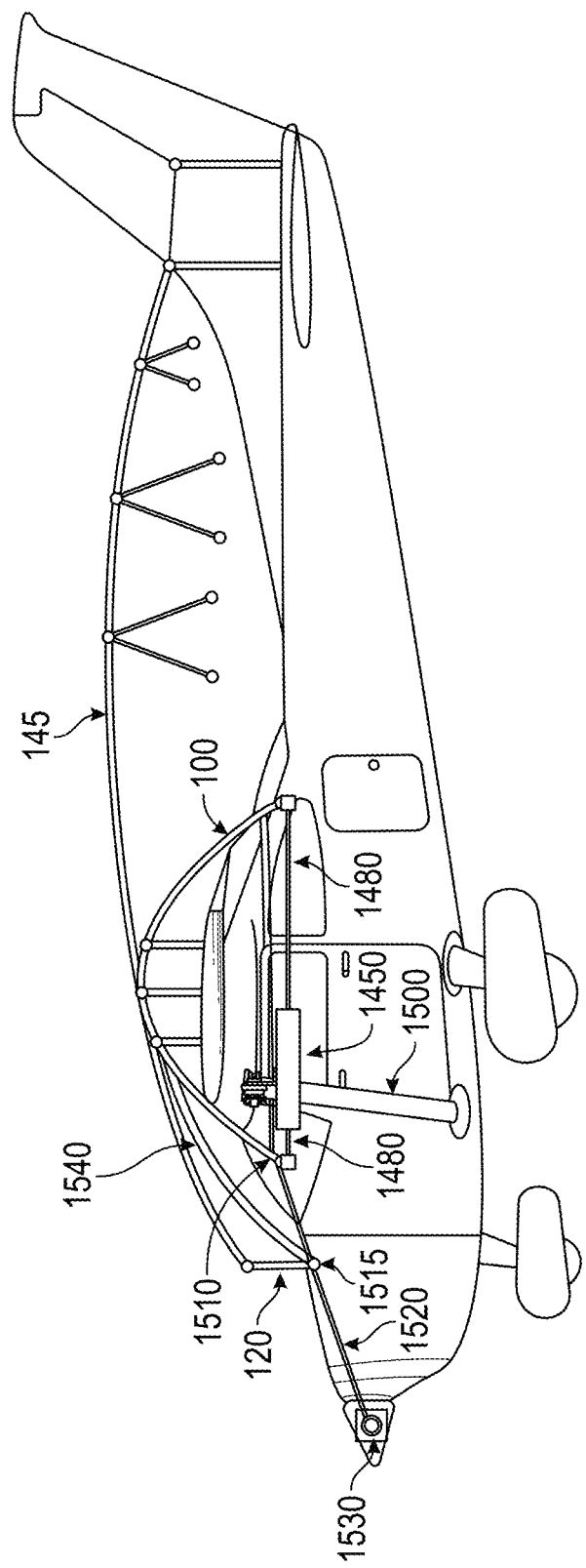
FIG. 15B is a side view of the aircraft in FIG. 15A showing one embodiment of the wing mounted base plate and support pole configuration utilizing a propeller mounted clamp for securing the support poles.

Referring to FIG. 15B, a side view of the support pole configuration as depicted in FIG. 15A is shown. Base plate 1450 is more clearly shown attached to the aircraft. Support pole 1520 and its interface with anchor pole 100, base plate pole 1480, support pole 1540, and propeller mounting clamp 1530 is also more clearly visible.

Figure 15C:
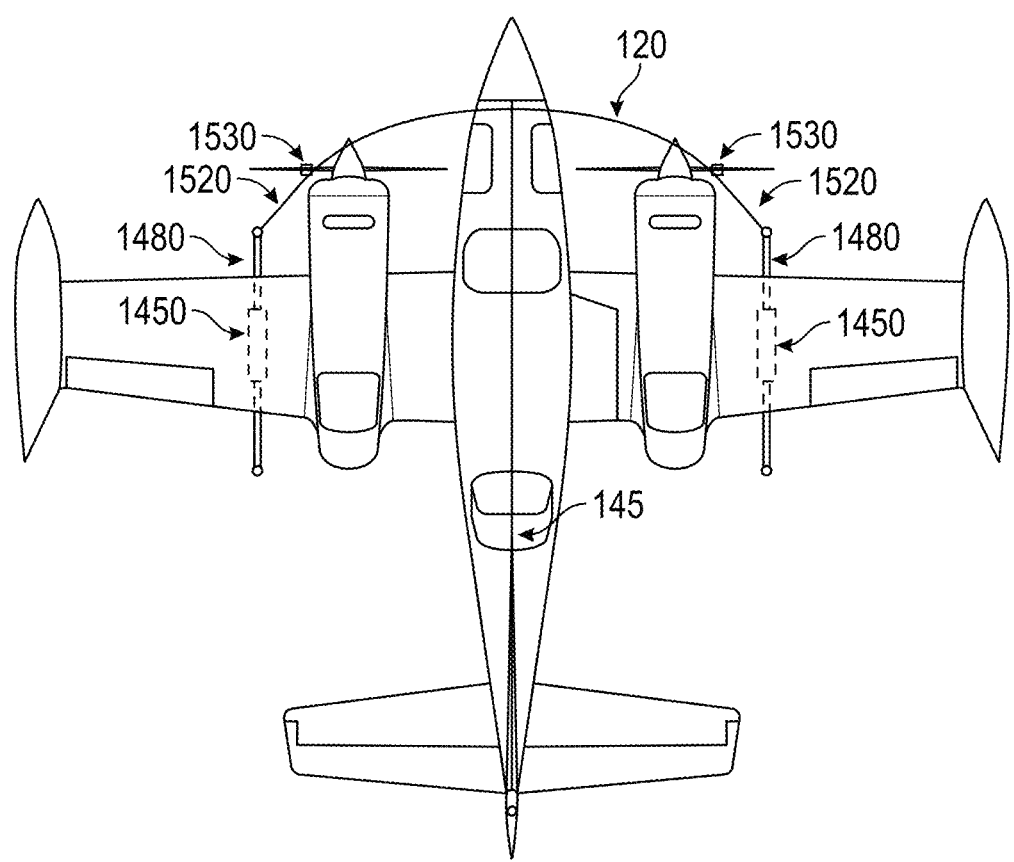
FIG. 15C is a plan view of a twin-engine airplane including an embodiment of tie downs and propeller mounted clamps used to secure the nose anchor pole component.

Referring to FIG. 15C an embodiment of the strut-mounted base plate adapted for use with a twin-engine aircraft is shown. The aircraft, a Cessna 310 is shown. The illustrated configuration utilizes a tie down fixture to secure base plate 1450 and base plate poles 1480. The base plates, in one embodiment may be fitted under the aircraft's wheel, or alternatively attached by using a wing mount (including a suction mount) or clamp as shown in the alternative embodiments herein. Support pole 1520 connects to clamp mount 1530 affixed to the outboard blade of the aircraft's propellers. In this embodiment, clamp mount 1530 incorporates two support pole securing apparatuses as discussed infra, to anchor support pole 1520 as well as nose anchor pole 120. As in previous embodiments, longitudinal support pole 145 attached to nose anchor pole 120 for support.

One embodiment of a method of assembly of the portable aircraft cover, with reference to FIG. 2 and FIG. 7A, is as follows:

Lay out the main wheel base plates 115 and nose wheel base plate 135 behind the main wheel and nose wheel of the aircraft. Alternatively, secure base plates to the aircraft via the wing clamp, suction clamp or strut clamp. Insert the base plate poles 110 and 130 into the main wheel and nose wheel base plates respectively.

Roll the aircraft onto the main wheel and nose wheel base plates such that the aircraft's weight secures the base plates to the ground. Alternatively strut, tie down or suction mounted clamps are used to secure the base plate into position.

Extend the right and left wing anchor poles 100 and nose anchor pole 120. In one embodiment, each poles series can be color coded to make it easier to visually distinguish between the poles and their intended position. In one embodiment, the poles may also be numbered, to simplify the sequential assembly of the elements. Other methods of marking the poles to simplify assembly may also be used.

Insert right and left forward anchor pole forward ends into one of the connectors 140 located at the ends of nose anchor pole 130, and insert the other end of the right and left anchor pole into the aft connector of main wheel base pole 110. For a high wing aircraft use can be made of the built-in step on the either side of the nose of the aircraft to guide the anchor poles over the wings. This step is standard part of high wing aircraft and is designed to allow the pilot to visually inspect the aircraft fuel ports located on the top of the wing.

Insert nose anchor pole ends into the second of the connector ports in 140 on each end of anchor pole 130.

Slip the wing tip cuffs 310 over the left and right wing tips respectively.

Slip the horizontal stabilizer cuffs 320 over the end of the aircrafts horizontal stabilizer. In one embodiment, the sheet material incorporates the wing tip cuffs and the horizontal stabilizer cuff as one continuous piece of material.

Attach the vertical stabilizer anchor cuff to the vertical stabilizer, to ensure it is tightly secured. In one embodiment, this may be done using tightening straps or hook and loop fasters 840 as shown in FIG. 8B. Zip on the cover sheet material of the horizontal stabilizer, and in one embodiment seal the zipper. In one embodiment, for zippers which are not water tight, hook and loop fasteners or other methods to cover the seal may be used to prevent rain and the elements from causing damage. In one embodiment, this seal cover is incorporated into the sheet material.

Extend main longitudinal support pole 145, and main lateral support pole 150. These can each be color coded, labeled, or otherwise marked to avoid confusion as to which is the correct pole, particularly at night or in harsh weather conditions.

Insert and lock the ends of the main longitudinal support pole 145 into hub connector type A on the nose anchor pole and into connector type B located on vertical stabilizer anchor cuff 840. Insert and lock main lateral support pole 150 into connector type B ports on the wing tip cuff 310. Lock the main longitudinal support pole and the main lateral support pole together at their point of intersection using connector hub type A.

Extend supplemental longitudinal support poles 160, and supplemental latitudinal support poles 155, which can also be marked to avoid confusion among the different support poles and their placement. As with the main latitudinal support pole, lock the ends of latitudinal support poles 155 into the connector type B port on wing cuff 310. Attach longitudinal support poles 170 to the connector type B ports located along the leading and trailing edge of the cover sheet material between the right and left wing anchor poles and the right and left wing cuff respectively.

Lock the latitudinal support poles and the longitudinal support poles at the intersection points of each. In one embodiment hub type A connectors may be used.

Attach the sheet material to the support poles. In one embodiment, this may be done using type C clip connectors illustrated in FIG. 5.

It is anticipated that the aircraft cover described could be provided as a kit for assembly by a consumer, and carried in the aircraft to be covered and protected. The entire cover, including support poles, base plates and poles, and the covering sheet material is very light weight, and compact, and capable of being loaded and carried within the airplane without having an adverse impact on the airplanes load carrying capabilities, either in terms of the number of passengers and baggage that can be carried or the amount of fuel carried.

Figure 16:
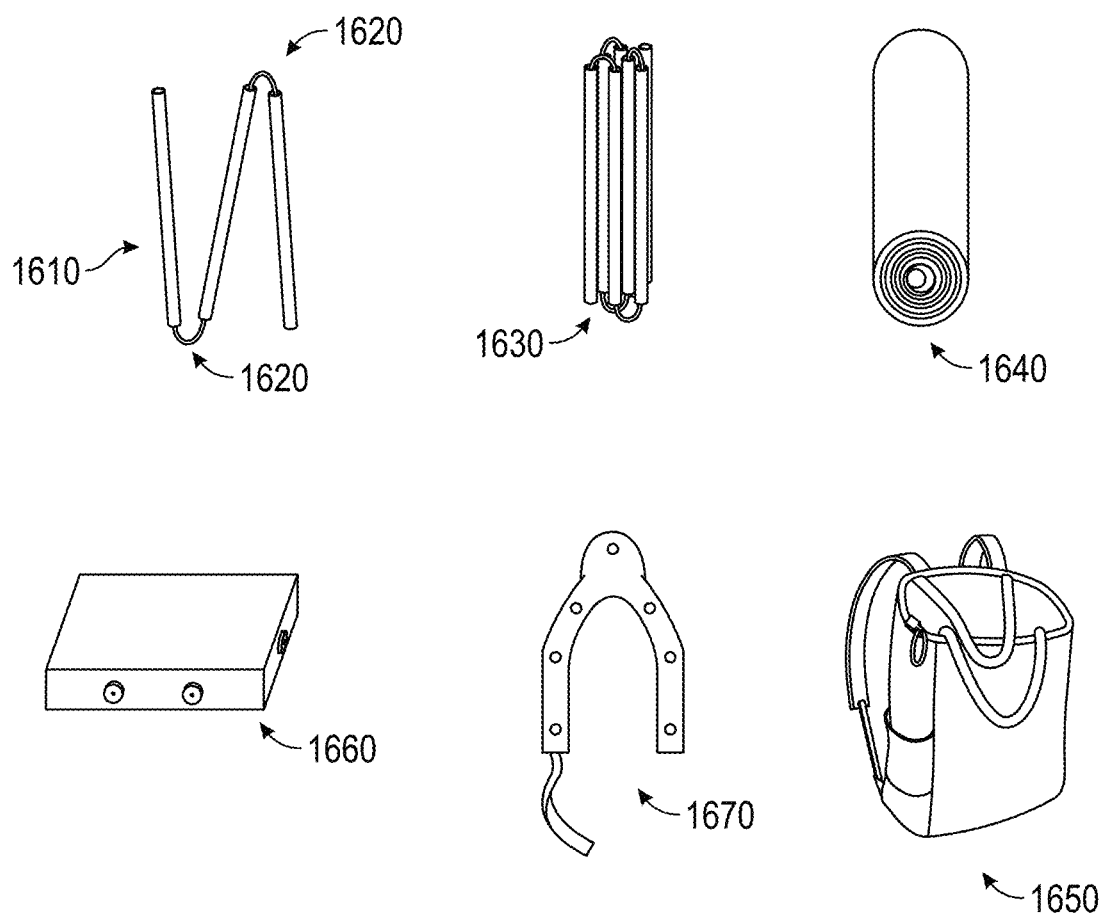
FIG. 16 depicts the major component parts of one embodiment of the lightweight portable aircraft cover including carrying pack; and Appendix 1 is a listing of the dimensions of various fixed wing aircraft, that can be used to calculate the dimensions of the component parts used.

Referring to FIG. 16, the elements of one embodiment of the kit are shown. The collapsible support and anchor poles are shown prior to being coupled together, with each pole segment 1610 connected to other poles segments by elastic internal silicon core shock cord 1620. Each support pole and anchor pole is comprised of pole segments such as that shown as 1610 connected by shock cord 1620, and can be bundled together as shown in 1630. To differentiate each support pole and easily determine where it is to be deployed within the invention, color coding, numbering, engraving, patterning or other marking can be used, with each marked pole being used in a specified location within the system. Collectively the individual support pole bundles 1630 and rolled up cover sheet material 1640, can be placed into lightweight carrier bag 1650, along with base plates 1660 and anchor cuff 1670 as previous described. Carrier bag 1650 is constructed of an ultralight material such as 70D 100% Nylon Ripstop, such as the lightweight travel tote manufactured by Patagonia in Ventura, Calif.

While the invention has been described using one type of aircraft, the cover sheet and pole arrangement described may be adapted to be used in many different types of aircraft, single engine, such as the Cessna 182 used in the current description, and well as low wing single engine aircraft, and multiengine aircraft, etc. Simple adjustments based on the aircraft's size and dimensions can be adjusted to create the appropriate anchor pole lengths, main support pole lengths, and supplemental support pole lengths. Likewise, the design can be adjusted for conventional geared aircraft (tail wheel aircraft). The design, using a base plate, secured either through the use of the vehicles weight or through the use of clamps or other attachment mechanisms to secure the base plate to the vehicle itself, can also be adapted to other types of vehicles. For example, it could be used for automobiles for the protection of expensive, new or classic cars that are left out in the elements, or boats docked in a marina. Claims in one embodiment, may be attached to the boat hand rails, or a suction cup can be used.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

I claim:

1. A light weight, portable cover designed to be erected above a vehicle, that can be carried within the vehicle, comprising:
    a light weight base plate adapted to be secured by the vehicle;
    a plurality of independent collapsible poles designed to be securely coupled to each other and to the light weight base plate, the base plate and the plurality of independent collapsible poles forming a frame support structure, the plurality of independent collapsible poles including a first set of anchor poles coupled to the base plate and adapted to extend across over the vehicle, and a second set of support poles coupled to one or more of the anchor poles;
    a light weight sheet material shaped to match a top surface area of the vehicle and adapted to cover the vehicle, the sheet material having pockets adapted to be fitted to a peripheral edge of the vehicle and adapted to engage with one or more of the collapsible poles and the vehicle when erected, the sheet material further removably coupled to the frame support structure using a plurality of connectors, and the sheet material is adapted to be suspended above the vehicle.

2. The cover of claim 1, wherein the base plate and the poles are made of an aluminum alloy.

3. The cover of claim 2, wherein the aluminum alloy is one or more of: aluminum 7075 and aluminum 7075 tempered to 7075-T9.

4. The cover of claim 1, wherein the sheet material is one of SilNylon and Dyneema fabric.

5. The cover of claim 1, wherein the sheet material, the base plate and the plurality of poles are made of a carbon fiber material.

6. The cover of claim 1, wherein the vehicle's weight is used to secure the base plate.

7. The cover of claim 1, wherein the base plate is adapted to be positioned under a wheel of the vehicle, and the cover is adapted to be secured by a weight of the vehicle.

8. The cover of claim 1, wherein the vehicle is an aircraft.

9. The cover of claim 8, wherein the base plate is adapted to be attached to a wing strut of the aircraft.

10. The cover of claim 8, wherein the base plate is adapted to be attached to a wing of the aircraft.

11. The cover of claim 10, wherein the base plate is adapted to be attached to the wing using a cuff, wherein the cuff is adapted to be coupled to the wing's leading edge.

12. The cover of claim 10, wherein the base plate is adapted to be attached to the wing using a suction clamp.

13. The cover of claim 1, wherein a collapsible pole includes a shock cord within the pole, and the pole is coded to simplify assembly.

14. The cover of claim 1, wherein the plurality of poles have an arcuate shape when assembled, designed to keep a buffer between the sheet material and a surface of the vehicle, to provide protection against the elements.

15. The cover of claim 1, further including a bag for carrying the light weight portable cover, wherein the lightweight portable cover weighs less than 10 pounds.

16. A light weight, compact, portable shelter for an airplane, that can be carried within the airplane, comprising:
    a light weight base plate designed to be secured by a weight of the airplane;
    a plurality of collapsible poles connected to the base plate;
    a plurality of independent collapsible secondary poles, a subset of the secondary poles crossed and coupled to one or more of the plurality of collapsible poles, the plurality of secondary poles in combination with the collapsible poles to form a rigid frame adapted to be around the airplane; and
    an ultra-lightweight light weight sheet material removably coupled to the rigid frame using a plurality of connectors, the light weight sheet material designed to be engaged with the airplane and partially suspended above the airplane, wherein once deployed the rigid frame and sheet material forms a rigid light weight portable shelter for the airplane and adapted to be coupled to the airplane.

17. The cover of claim 16, wherein each of the plurality of collapsible poles and each of the plurality of secondary poles have an internal elastic shock cord.

18. The cover of claim 16, wherein each of the plurality of collapsible poles and each of the plurality of secondary poles has a given position in the rigid frame, and the given position designated by a marking on the pole.

19. A light weight, portable cover designed to be erected over a vehicle, that can be carried within the vehicle, comprising:
    a light weight base plate adapted to be under and secured by the vehicle and having a plurality of anchor poles extending away from the base plate, wherein one endpoint of each anchor pole is connected to an arcuate pole arching over the vehicle;

a plurality of independent collapsible poles designed to be coupled to the arcuate pole;

the base plate, the arcuate pole and the plurality of independent collapsible poles forming a frame support structure over the vehicle;

a light weight sheet material placed over the frame support structure and adapted to be suspended above and to cover the vehicle, the sheet material having pockets adapted to be fitted to a peripheral edge of the vehicle and adapted to engage one or more of the collapsible poles to the vehicle when erected, the sheet material having a plurality of connectors to engage the sheet material and removably secure the light weight sheet material to the frame support structure.

* * * * *